(12) United States Patent
Sakurai et al.

(10) Patent No.: US 11,829,048 B2
(45) Date of Patent: Nov. 28, 2023

(54) LASER BEAM OUTPUT APPARATUS

(71) Applicant: ADVANTEST Corporation, Tokyo (JP)

(72) Inventors: Takao Sakurai, Miyagi (JP); Shin Masuda, Miyagi (JP); Tomoki Joichi, Miyagi (JP); Masao Fujino, Miyagi (JP)

(73) Assignee: ADVANTEST CORPORATION, Tokyo (JP)

( * ) Notice: Subject to any disclaimer, the term of this patent is extended or adjusted under 35 U.S.C. 154(b) by 777 days.

(21) Appl. No.: 16/793,561

(22) Filed: Feb. 18, 2020

(65) Prior Publication Data

US 2020/0310220 A1 Oct. 1, 2020

(30) Foreign Application Priority Data

Mar. 28, 2019 (JP) ................................ 2019-064194
Dec. 27, 2019 (JP) ................................ 2019-239390

(51) Int. Cl.
*G02F 1/335* (2006.01)
*G02F 1/355* (2006.01)

(52) U.S. Cl.
CPC ............ *G02F 1/335* (2013.01); *G02F 1/3551* (2013.01); *G02F 2203/05* (2013.01)

(58) Field of Classification Search
CPC ...... G02F 1/3551; G02F 1/3558; G02F 1/335; G02F 2203/26
See application file for complete search history.

(56) References Cited

U.S. PATENT DOCUMENTS

| 6,154,310 A | 11/2000 | Galvanauskas et al. |
| 6,334,011 B1 | 12/2001 | Galvanauskas et al. |
| 8,774,236 B2 * | 7/2014 | Ter-Mikirtychev ......................... H01S 3/0092 372/5 |
| 10,534,128 B2 * | 1/2020 | Otani .................. H01S 3/06783 |
| 2004/0075883 A1 | 4/2004 | Galvanauskas et al. |

(Continued)

FOREIGN PATENT DOCUMENTS

| JP | H11-284260 A | 10/1999 |
| JP | 2011-107094 A | 6/2011 |

(Continued)

OTHER PUBLICATIONS

Japan Office Action, dated Oct. 25, 2022, by the Japan Patent Office (JPO), in Japanese Patent Application No. 2019-239390.

*Primary Examiner* — Christopher Stanford
*Assistant Examiner* — Journey F Sumlar
(74) *Attorney, Agent, or Firm* — GREENBLUM & BERNSTEIN, P.L.C.

(57) ABSTRACT

A laser beam output apparatus includes a pulsed laser output section, an optical path determining section, a wavelength changing section, and a multiplexer. The pulsed laser output section outputs a laser beam having a predetermined wavelength as first pulses. The optical path determining section receives the first pulses and determines one among a plurality of optical paths for each of the first pulses for output. The wavelength changing section receives light beams traveling, respectively, through the plurality of optical paths and changes the light beams to have their respective different wavelengths for output. The multiplexer multiplexes outputs from the wavelength changing section.

15 Claims, 15 Drawing Sheets

(56) References Cited

U.S. PATENT DOCUMENTS

| | | | |
|---|---|---|---|
| 2006/0039423 A1* | 2/2006 | Tokuhisa | ............... G02F 1/353 372/22 |
| 2017/0023843 A1 | 1/2017 | Seifert | |
| 2019/0041620 A1 | 2/2019 | Mikami et al. | |

FOREIGN PATENT DOCUMENTS

| | | |
|---|---|---|
| JP | 2011-137594 A | 7/2011 |
| JP | 2016-101393 A | 6/2016 |
| WO | 2016/084720 A1 | 6/2016 |
| WO | 2017/138619 A1 | 8/2017 |

\* cited by examiner

LASER BEAM OUTPUT APPARATUS

BACKGROUND OF THE INVENTION

Field of the Invention

The present invention relates to outputting laser pulsed light of multiple wavelengths.

Description of the Related Art

There has conventionally been known measuring (e.g. blood oxygen saturation level) in response to (e.g. based on the absorption coefficient of) pulsed light irradiation of a to-be-measured object (e.g. living organism). It has also been known that response from a to-be-measured object varies depending on the wavelength of pulsed light. It has hence been desired to irradiate a to-be-measured object with pulsed light of multiple wavelengths in terms of an increase in measurement accuracy. In this case, an increased amount of time between irradiation of a point P of a to-be-measured object with pulsed light of one wavelength and irradiation of the point P with pulsed light of another wavelength may give rise to a decrease in measurement accuracy due to movement (e.g. body movement) of the to-be-measured object.

However, there has not been known any technique of irradiation with pulsed light (one or more pulses of light) of one wavelength and immediately thereafter irradiation with pulsed light (one or more pulses of light) of another wavelength. For example, Japanese Patent Application Publication No. 2011-107094, WO 2017/138619, and Japanese Patent Application Publication No. 2016-101393 describe multiplexing of laser beams having their respective different wavelengths, but not for the case of irradiation with pulsed light of one wavelength and immediately thereafter irradiation with pulsed light of another wavelength.

SUMMARY OF THE INVENTION

It is hence an object of the present invention to provide for irradiation with pulsed light (one or more pulses of light) of one wavelength and immediately thereafter irradiation with pulsed light (one or more pulses of light) of another wavelength.

According to the present invention, a laser beam output apparatus includes: a pulsed laser output section that outputs a laser beam having a predetermined wavelength as first pulses; an optical path determining section that receives the first pulses and determines one among a plurality of optical paths for each of the first pulses for output; a wavelength changing section that receives light beams traveling, respectively, through the plurality of optical paths and changes the light beams to have their respective different wavelengths for output; and a multiplexer that multiplexes outputs from the wavelength changing section.

According to the thus constructed laser beam output apparatus, a pulsed laser output section outputs a laser beam having a predetermined wavelength as first pulses. An optical path determining section receives the first pulses and determines one among a plurality of optical paths for each of the first pulses for output. A wavelength changing section receives light beams traveling, respectively, through the plurality of optical paths and changes the light beams to have their respective different wavelengths for output. A multiplexer multiplexes outputs from the wavelength changing section.

According to the laser beam output apparatus of the present invention, the first pulses may have a predetermined frequency, and the optical path determining section may output, respectively on the plurality of optical paths, second pulses having a frequency obtained by dividing the predetermined frequency by the number of the plurality of optical paths and having their respective different phases.

According to the laser beam output apparatus of the present invention, the multiplexer may output third pulses having the predetermined frequency.

According to the laser beam output apparatus of the present invention, the optical path determining section may output, respectively on the plurality of optical paths, second pulses among the first pulses within predetermined temporal ranges thereof, the predetermined temporal ranges not overlapping each other.

According to the laser beam output apparatus of the present invention, the first pulses may be from a pseudo-random signal.

According to the laser beam output apparatus of the present invention, the pulsed laser output section may be a pumping laser.

According to the laser beam output apparatus of the present invention, the optical path determining section may be an acousto-optical modulator or an acousto-optical deflector.

According to the laser beam output apparatus of the present invention, the wavelength changing section may have polarization reversed sections arranged with predetermined spacing therebetween through which the traveling light beams propagate, and the predetermined spacing may be different for each of the traveling light beams.

According to the laser beam output apparatus of the present invention, the wavelength changing section may have a non-linear optical crystal substrate with the polarization reversed sections formed therein, and the graphical centers of the polarization reversed sections may be arranged on a straight line parallel to an X axis of the non-linear optical crystal substrate.

According to the laser beam output apparatus of the present invention, the graphical centers of the polarization reversed sections may be arranged on a straight line parallel to the traveling direction of the traveling light beams.

According to the laser beam output apparatus of the present invention, the wavelength changing section may have one non-linear optical crystal substrate with all of the polarization reversed sections formed therein.

According to the laser beam output apparatus of the present invention, the wavelength changing section may have a non-linear optical crystal substrate with the polarization reversed sections formed therein, and the non-linear optical crystal substrate may be provided for each of the traveling light beams that propagate therethrough.

According to the laser beam output apparatus of the present invention, the wavelength changing section may have a non-linear optical crystal through which the traveling light beams propagate.

According to the present invention, the laser beam output apparatus may further include an optical fiber with one end receiving an output from the multiplexer for output at the other end thereof.

According to the present invention, the laser beam output apparatus may further include a timing control section that times an output from the optical path determining section to an output of the first pulses.

According to the laser beam output apparatus of the present invention, the optical path determining section may have: a first acousto-optical modulator that receives the first pulses and determines one among a plurality of optical paths for each of the first pulses for output; and a second acousto-optical modulator that receives an output from the first acousto-optical modulator and determines one among one or more optical paths for each pulse of the output from the first acousto-optical modulator for output.

According to the laser beam output apparatus of the present invention, the first acousto-optical modulator may diffract or directly advance each of the first pulses for output, and the second acousto-optical modulator may receive and diffract or directly advance the directly advanced ones of the first pulses for output, while receive and directly advance the diffracted ones of the first pulses for output.

According to the laser beam output apparatus of the present invention, the first acousto-optical modulator may diffract or directly advance each of the first pulses for output, and the second acousto-optical modulator may receive and diffract or directly advance the diffracted ones of the first pulses for output, while receive and directly advance the directly advanced ones of the first pulses for output.

According to the laser beam output apparatus of the present invention, the first acousto-optical modulator may diffract or directly advance each of the first pulses for output, and the second acousto-optical modulator diffract or directly advance each pulse of the output from the first acousto-optical modulator for output.

DESCRIPTION OF THE PREFERRED EMBODIMENTS

A description will now be given of embodiments of the present invention referring to drawings.

First Embodiment

Figure 1:
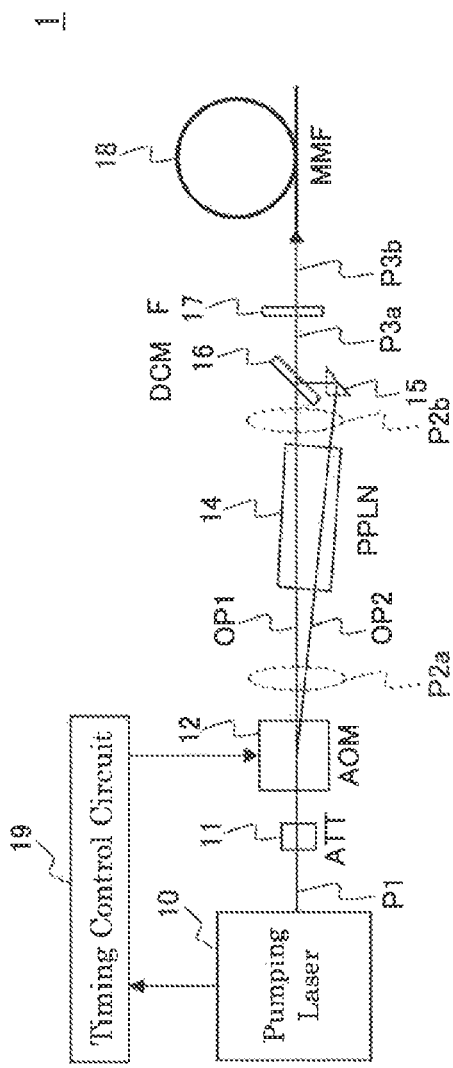
FIG. 1 shows a configuration of a laser beam output apparatus 1 according to a first embodiment.
Figure 2:
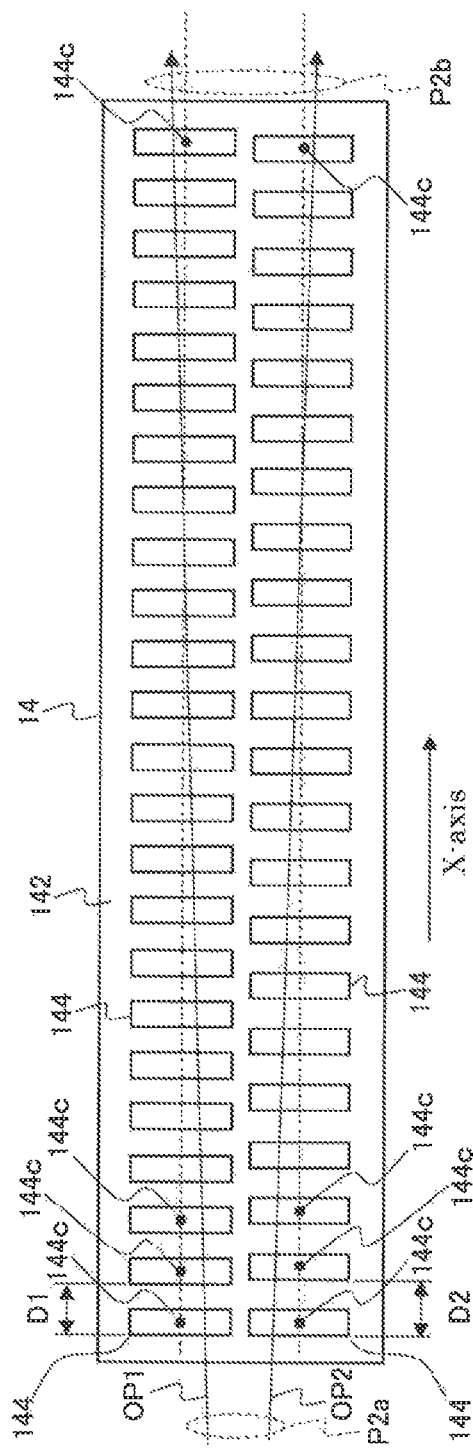
FIG. 2 is a plan view of a wavelength changing section 14 according to the first embodiment.
Figure 3:
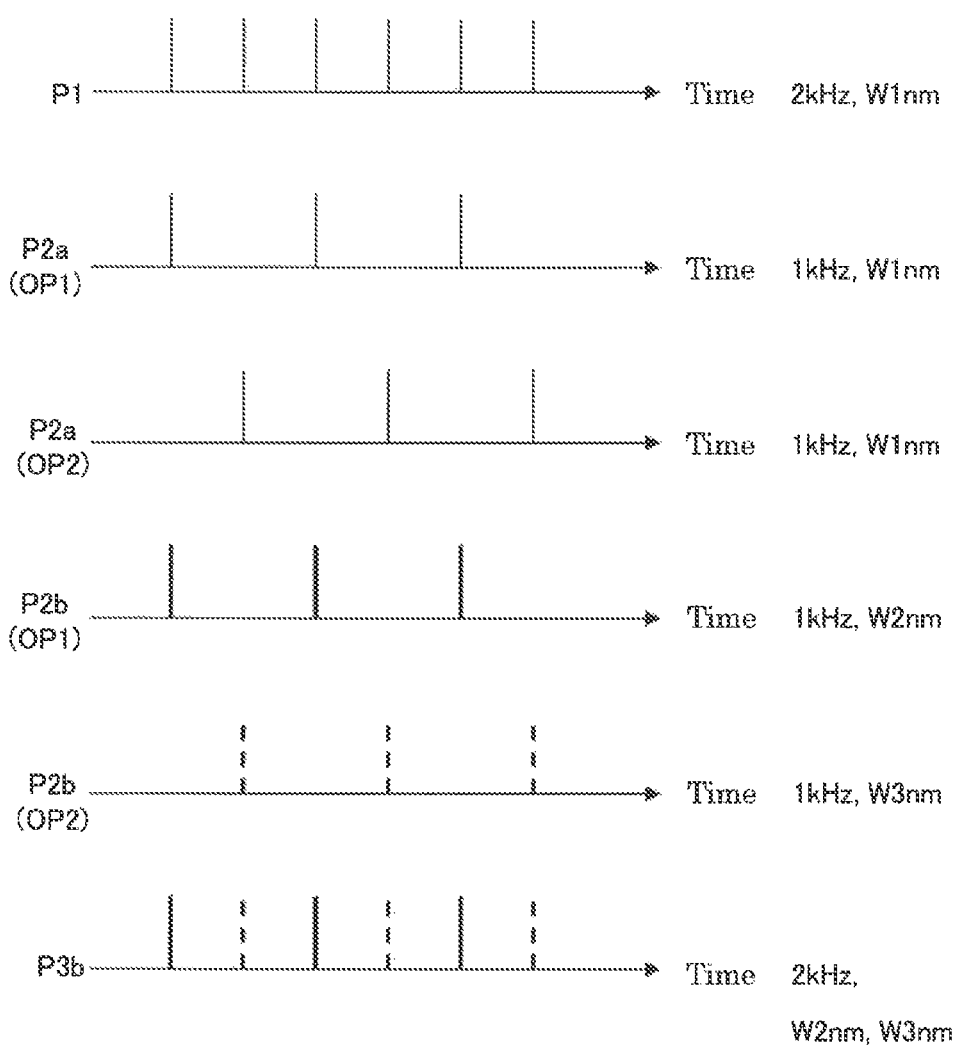
FIG. 3 shows timing charts of first pulses P1, second pulses (before wavelength conversion) P2a, second pulses (after wavelength conversion) P2b, and third pulses (after filtering) P3b according to the first embodiment.

FIG. 1 shows a configuration of a laser beam output apparatus 1 according to a first embodiment. FIG. 2 is a plan view of a wavelength changing section 14 according to the first embodiment. FIG. 3 shows timing charts of first pulses P1, second pulses (before wavelength conversion) P2a, second pulses (after wavelength conversion) P2b, and third pulses (after filtering) P3b according to the first embodiment. It is noted that in FIG. 3, the thickness and type (solid or broken) of lines indicating the pulses vary depending on the wavelength.

The laser beam output apparatus 1 according to the first embodiment includes a pumping laser (pulsed laser output section) 10, an optical attenuator (ATT) 11, an acousto-optical modulator (optical path determining section) (AOM) 12, a wavelength changing section (PPLN) 14, a mirror 15, a dichroic mirror (multiplexer) (DCM) 16, a filter (F) 17, an optical fiber (MMF) 18, and a timing control circuit (timing control section) 19.

The pumping laser (pulsed laser output section) 10 is arranged to output a laser beam having a predetermined wavelength W1 [nm] as first pulses P1 having a predetermined frequency (e.g. 2 kHz) (see FIG. 3). The pumping laser 10 is, for example, a Yb:YAG laser.

The optical attenuator (ATT) 11 is arranged to attenuate and provide the first pulses P1 to the acousto-optical modulator 12.

The acousto-optical modulator (optical path determining section) (AOM) 12 is arranged to receive the first pulses P1 and determine one among multiple optical paths OP1, OP2 for each of the first pulses P1 for output.

For example, with reference to FIGS. 1 and 3, at the time the acousto-optical modulator 12 receives odd-numbered (1st, 3rd, 5th . . . ) ones of the first pulses P1, no acoustic wave is provided to the acousto-optical modulator 12. The odd-numbered ones of the first pulses P1 then directly go straight through the acousto-optical modulator 12 (optical path OP1).

On the other hand, at the time the acousto-optical modulator 12 receives even-numbered (2nd, 4th, 6th . . . ) ones of the first pulses P1, an acoustic wave (with an angular frequency $\omega 2$) is provided to the acousto-optical modulator 12. The even-numbered ones of the first pulses P1 then go through the acousto-optical modulator 12 with some degree of diffraction (optical path OP2).

Note, however, that at the time the acousto-optical modulator 12 receives odd-numbered ones of the first pulses P1, an acoustic wave (with an angular frequency $\omega 1$, which is different from $\omega 2$) may be provided to the acousto-optical modulator 12.

This causes the acousto-optical modulator 12 to output, respectively on the multiple optical paths OP1, OP2, second pulses (before wavelength conversion) P2a having a frequency (1 kHz) obtained by dividing the predetermined frequency (e.g. 2 kHz) by the number (two) of the multiple optical paths and having their respective 180-degree different phases.

The timing control circuit (timing control section) 19 is arranged to time an output from the acousto-optical modulator (optical path determining section) 12 to an output of the first pulses P1. The result of timing has heretofore been described with reference to FIG. 3. It is noted that the timing control circuit 19 is arranged to receive a signal in synchronization with the timing of the output of the first pulses P1 from the pumping laser (pulsed laser output section) 10 and, based on this signal, control the timing of the output from the acousto-optical modulator 12.

The wavelength changing section (PPLN) 14 is arranged to receive light beams (i.e. second pulses P2a) traveling, respectively, through the multiple optical paths OP1, OP2 and changes the light beams to have their respective different wavelengths for output. The wavelength changing section 14 outputs second pulses (after wavelength conversion) P2b.

With reference to FIG. 3, the wavelength changing section 14 is arranged to receive and convert ones (wavelength W1 [nm]) of the second pulses P2a traveling through the optical path OP1 into second pulses P2b (wavelength W2 [nm]). The wavelength changing section 14 is also arranged to receive and convert ones (wavelength W1 [nm]) of the second pulses P2a traveling through the optical path OP2 into second pulses P2b (wavelength W3 [nm]).

With reference to FIG. 2, the wavelength changing section 14 has an LN crystal substrate 142 and polarization reversed sections 144. It is noted that in FIG. 2, unlike FIG. 1, the X-axis direction of the LN crystal substrate 142 is shown in parallel to the longitudinal direction of the drawing sheet, for illustrative convenience.

The polarization reversed sections 144 are arranged such that traveling light beams (i.e. second pulses P2a) propagate therethrough. The polarization reversed sections 144 include ones through which the second pulses P2a traveling through the optical path OP1 propagate and the others through which the second pulses P2a traveling through the optical path OP2 propagate. It is noted that the polarization reversed sections 144 are made of PPLN (periodically polarization-reversed lithium niobate) in FIG. 2, but not limited thereto and may be made of, for example, PPLT (lithium tantalite) or PPKTP.

The polarization reversed sections 144 through which the second pulses P2a traveling through the optical path OP1 propagate are arranged at predetermined spacing D1. The polarization reversed sections 144 through which the second pulses P2a traveling through the optical path OP2 propagate are arranged at predetermined spacing D2. The predetermined spacing varies from one traveling light beam to another. That is, the predetermined spacing D1 is different from the predetermined spacing D2.

The polarization reversed sections 144 are formed in the LN crystal substrate 142. All of the polarization reversed sections 144 are formed in the single LN crystal substrate 142. It is noted that in the first embodiment, the LN crystal substrate 142 may not be an LN crystal substrate as long as being a non-linear optical crystal substrate. This applies to other embodiments, in which a non-linear optical crystal substrate can be used instead of such an LN crystal substrate.

The graphical centers 144c of the polarization reversed sections 144 through which the second pulses P2a traveling through the optical path OP1 propagate are arranged on a straight line parallel to the X axis of the LN crystal substrate 142. The graphical centers 144c of the polarization reversed sections 144 through which the second pulses P2a traveling through the optical path OP2 propagate are also arranged on a straight line parallel to the X axis of the LN crystal substrate 142. It is noted that the graphical centers 144c of the polarization reversed sections 144 correspond to the centers of gravity with the assumption that the gravity acts uniformly on each polarization reversed section 144.

The mirror 15 is arranged to receive ones of the second pulses (after wavelength conversion) P2b traveling through the optical path OP2 and reflect them toward the dichroic mirror 16.

The dichroic mirror (multiplexer) (DCM) 16 is arranged to receive, from the wavelength changing section 14, ones of the second pulses (after wavelength conversion) P2b output from the wavelength changing section 14 and traveling through the optical path OP1. The dichroic mirror 16 is further arranged to receive, from the mirror 15, ones of the second pulses (after wavelength conversion) P2b output from the wavelength changing section 14 and traveling through the optical path OP2. The dichroic mirror 16 is further arranged to multiplex ones of the second pulses (after wavelength conversion) P2b output from the wavelength changing section 14 and traveling through the optical paths OP1 and OP2 and output third pulses (before filtering) P3a having a predetermined frequency (2 kHz).

Note, however, that in addition to the third pulses (before filtering) P3a, a laser beam (pump beam) output from the pumping laser 10 and having a wavelength W1 [nm] and an infrared idler beam originating from the wavelength changing section 14 are also mixed into the output from the dichroic mirror 16. It is noted that the wavelength changing section 14, when applied with a laser beam (pump beam), generates a signal beam and such an idler beam as described above due to optical parametric oscillation. The signal beam is thus output from the wavelength changing section 14 (as second pulses (after wavelength conversion) P2b) (the same applies to wavelength changing sections according to other embodiments).

The filter (F) 17 is arranged to remove the pump beam and the idler beam from the third pulses (before filtering) P3a to output third pulses (after filtering) P3b.

The optical fiber (MMF) 18 is arranged to receive, at one end thereof, the third pulses P3a output from the dichroic mirror 16 via the filter 17 for output at the other end thereof.

Next will be described an operation according to the first embodiment.

The pumping laser 10 first outputs a laser beam having a predetermined wavelength W1 [nm] as first pulses P1 having a predetermined frequency (e.g. 2 kHz) (see FIG. 3). The first pulses P1 are attenuated through the optical attenuator 11 and provided to the acousto-optical modulator 12. The timing control circuit 19 controls the timing of the output from the acousto-optical modulator 12 (see FIG. 3).

At the time the acousto-optical modulator 12 receives odd-numbered (1st, 3rd, 5th . . . ) ones of the first pulses P1, no acoustic wave is provided to the acousto-optical modulator 12. This causes the odd-numbered ones of the first pulses P1 to directly go straight through the acousto-optical modulator 12 (optical path OP1). This causes light beams traveling through the optical path OP1 to be second pulses (before wavelength conversion) P2a having a frequency (1 kHz) obtained by dividing the predetermined frequency (e.g. 2 kHz) by the number (two) of the multiple optical paths.

At the time the acousto-optical modulator 12 receives even-numbered (2nd, 4th, 6th . . . ) ones of the first pulses P1, an acoustic wave (with an angular frequency ω2) is provided to the acousto-optical modulator 12. This causes the even-numbered ones of the first pulses P1 to go through the acousto-optical modulator 12 with some degree of diffraction (optical path OP2). This causes light beams traveling through the optical path OP2 to be second pulses (before wavelength conversion) P2a having a frequency (1 kHz) obtained by dividing the predetermined frequency (e.g. 2 kHz) by the number (two) of the multiple optical paths.

In addition, the phase of the light beams traveling through the optical path OP1 (second pulses (before wavelength conversion) P2a) is 180-degree different from the phase of the light beams traveling through the optical path OP2 (second pulses (before wavelength conversion) P2a).

The light beams traveling through the optical path OP1 (second pulses (before wavelength conversion) P2a, with a wavelength W1 ([nm]) propagate through the polarization reserved sections 144, which are arranged at the predetermined spacing D1 in the wavelength changing section 14, to undergo wavelength conversion into W2 [nm] and provided to the dichroic mirror 16 as second pulses (after wavelength conversion) P2b.

The light beams traveling through the optical path OP2 (second pulses (before wavelength conversion) P2a, with a wavelength W1 [nm]) propagate through the polarization reserved sections 144, which are arranged at the predetermined spacing D2 in the wavelength changing section 14, to undergo wavelength conversion into W3 [nm], and reflected by the mirror 15 and provided to the dichroic mirror 16 as second pulses (after wavelength conversion) P2b.

Ones of the second pulses (after wavelength conversion) P2b output from the wavelength changing section 14 and having the wavelength W1 [nm] and the wavelength W3 [nm] are multiplexed through the dichroic mirror 16 to be third pulses (before filtering) P3a having a predetermined frequency (2 kHz).

The third pulses (before filtering) P3a undergo removal of the pump beam and the idler beam through the filter 17 to be third pulses (after filtering) P3b. The third pulses (after filtering) P3b is provided at one end of the optical fiber 18 for output at the other end.

In accordance with the first embodiment, the third pulses (after filtering) P3b can be output from the optical fiber 18. The third pulses (after filtering) P3b provides for irradiation with pulsed light of the wavelength W2 [nm] and immediately thereafter (e.g. after 500 microseconds) irradiation with pulsed light of the different wavelength W3 [nm]. That is, the first embodiment allows for irradiation with pulsed light of one wavelength and immediately thereafter irradiation with pulsed light of another wavelength.

It is noted that, the graphical centers 144c of the polarization reversed sections 144 are arranged on a straight line parallel to the X axis of the LN crystal substrate 142 in the first embodiment (see FIG. 2), but may be arranged as in the following variation.

Figure 4:
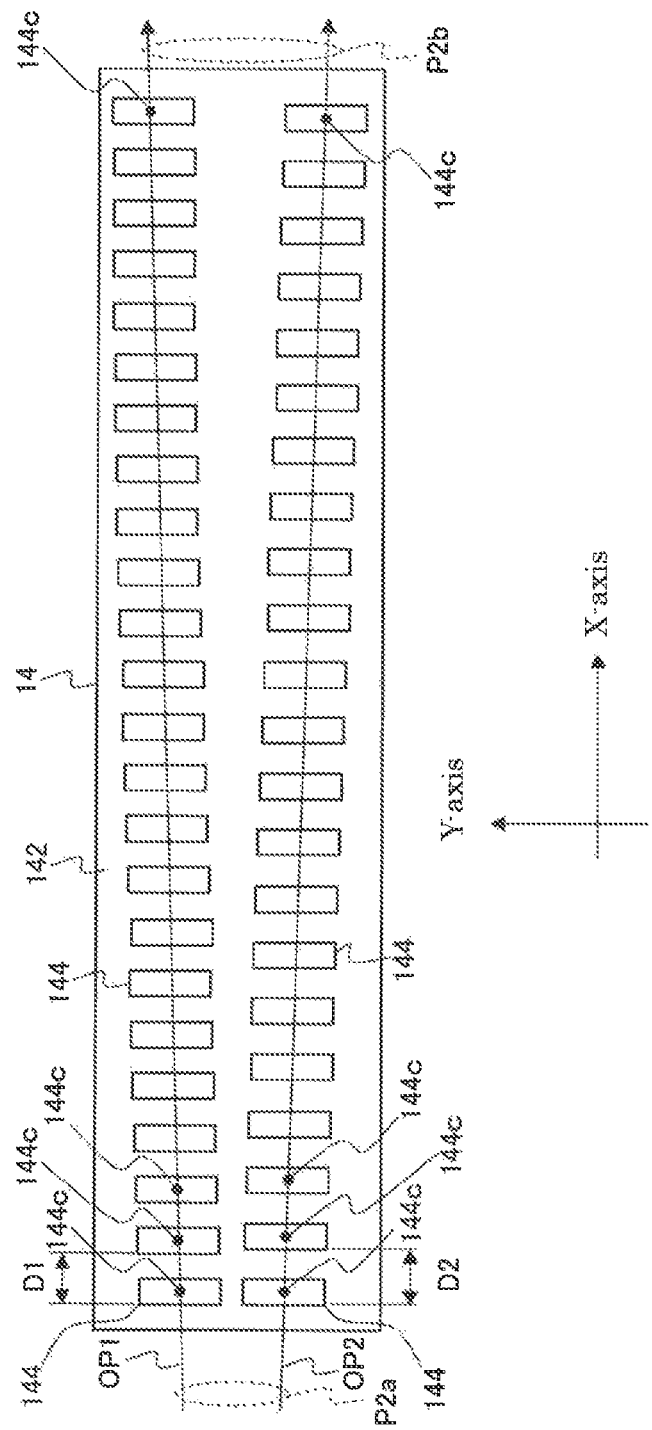
FIG. 4 is a plan view of a wavelength changing section 14 according to a variation of the first embodiment.

FIG. 4 is a plan view of a wavelength changing section 14 according to a variation of the first embodiment. It is noted that in FIG. 4, unlike FIG. 1 but like FIG. 2, the X-axis direction of the LN crystal substrate 142 is shown in parallel to the longitudinal direction of the drawing sheet, for illustrative convenience.

With reference to FIG. 4, in the wavelength changing section 14 according to the variation of the first embodiment, the polarization reversed sections 144 through which the traveling light beams (second pulses P2a traveling through the optical path OP1) propagate are arranged at the predetermined spacing D1 and the graphical centers 144c thereof are arranged on a straight line parallel to the traveling direction (e.g. on the traveling direction) of the traveling light beams (second pulses P2a traveling through the optical path OP1). The polarization reversed sections 144 through which the traveling light beams (second pulses P2a traveling through the optical path OP2) propagate are also arranged at the predetermined spacing D2 and the graphical centers 144c thereof are arranged on a straight line parallel to the traveling direction (e.g. on the traveling direction) of the traveling light beams (second pulses P2a traveling through the optical path OP2).

In accordance with the variation of the first embodiment as described above, the longitudinal length of each polarization reversed section 144 (in the Y-axis direction) can be reduced relative to the case in the first embodiment.

Further, while the polarization reversed sections 144 are provided in the wavelength changing section 14 in the first embodiment (see FIGS. 2 and 4), another variation may have a non-linear optical crystal through which traveling light beams propagate without such polarization reversed sections 144. For example, the wavelength changing section 14 may undergo BPM (birefringent phase matching)-based OPO (optical parametric oscillation), SHO (second harmonic generation), THG (third harmonic generation), or the like.

Second Embodiment

A laser beam output apparatus 1 according to a second embodiment is arranged such that LN crystal substrates are provided for the respective traveling light beams that propagate therethrough, which differs from the laser beam output apparatus 1 according to the first embodiment in which the single LN crystal substrate 142 is provided.

Figure 5:
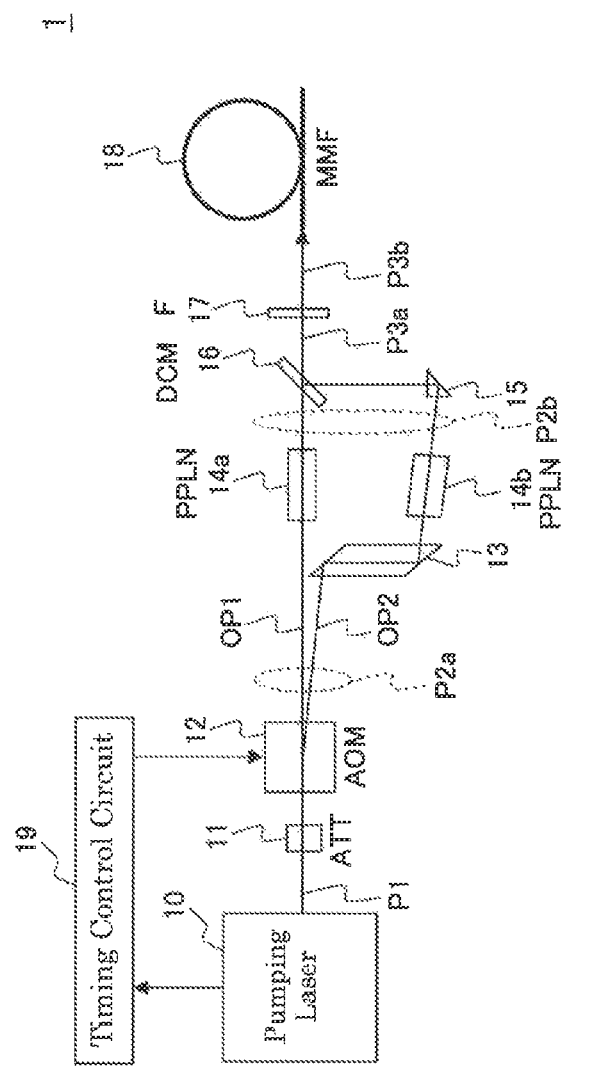
FIG. 5 shows a configuration of the laser beam output apparatus 1 according to the second embodiment.

FIG. 5 shows a configuration of the laser beam output apparatus 1 according to the second embodiment. The laser beam output apparatus 1 according to the second embodiment includes a pumping laser (pulsed laser output section) 10, an optical attenuator (ATT) 11, an acousto-optical modulator (optical path determining section) (AOM) 12, a rhomboid prism 13, wavelength changing sections (PPLN) 14a, 14b, a mirror 15, a dichroic mirror (multiplexer) (DCM) 16, a filter (F) 17, an optical fiber (MMF) 18, and a timing control circuit (timing control section) 19. Components identical to those in the first embodiment will hereinafter be designated by the same reference signs to omit the description thereof.

The pumping laser (pulsed laser output section) 10, the optical attenuator (ATT) 11, the acousto-optical modulator (optical path determining section) (AOM) 12, the mirror 15, the dichroic mirror (multiplexer) (DCM) 16, the filter (F) 17, the optical fiber (MMF) 18, and the timing control circuit (timing control section) 19 are identical to those in the first embodiment, and the description thereof will be omitted.

The rhomboid prism 13 is arranged to receive ones of the second pulses (before wavelength conversion) P2a traveling through the optical path OP2 and change the optical path in parallel away from the optical path OP1.

The wavelength changing section (PPLN) 14a is arranged to receive from the acousto-optical modulator 12 and convert ones (wavelength W1 [nm]) of the second pulses P2a traveling through the optical path OP1 into second pulses P2b (wavelength W2 [nm]). The arrangement of the wavelength changing section 14a corresponds to the polarization reversed sections 144 arranged at the predetermined spacing D1 and the LN crystal substrate 142 in which the polarization reversed sections 144 are formed as shown in FIG. 2 or 4.

The wavelength changing section (PPLN) 14b is arranged to receive from the rhomboid prism 13 and convert ones (wavelength [nm]) of the second pulses P2a traveling through the optical path OP2 into second pulses P2b (wavelength W3 [nm]). The arrangement of the wavelength changing section 14b corresponds to the polarization reversed sections 144 arranged at the predetermined spacing D2 and the LN crystal substrate 142 in which the polarization reversed sections 144 are formed as shown in FIG. 2 or 4.

It is noted that the LN crystal substrate that the wavelength changing section 14a has is not identical to the LN crystal substrate that the wavelength changing section 14b has. That is, the LN crystal substrate that the wavelength changing section 14a has and the LN crystal substrate that the wavelength changing section 14b has are provided, respectively; for the light beams (traveling through the optical path OP1 and the optical path OP2) that propagate therethrough.

Since the operation of the second embodiment is identical to that of the first embodiment, the description thereof will be omitted.

In accordance with the second embodiment, the LN crystal substrates are provided, respectively, for the light beams (traveling through the optical path OP1 and the optical path OP2) that propagate therethrough, whereby conditions of manufacture for the polarization reversed sections 144 can be set according to the predetermined spacing D1, D2, which makes it easy to manufacture the wavelength changing sections 14a, 14b.

Third Embodiment

The laser beam output apparatus 1 according to the third embodiment differs from the laser beam output apparatus 1 according to the first embodiment in that an acousto-optical deflector (AOD) (optical path determining section) 120 is used instead of the acousto-optical modulator (AOM) (optical path determining section) 12.

Figure 6:
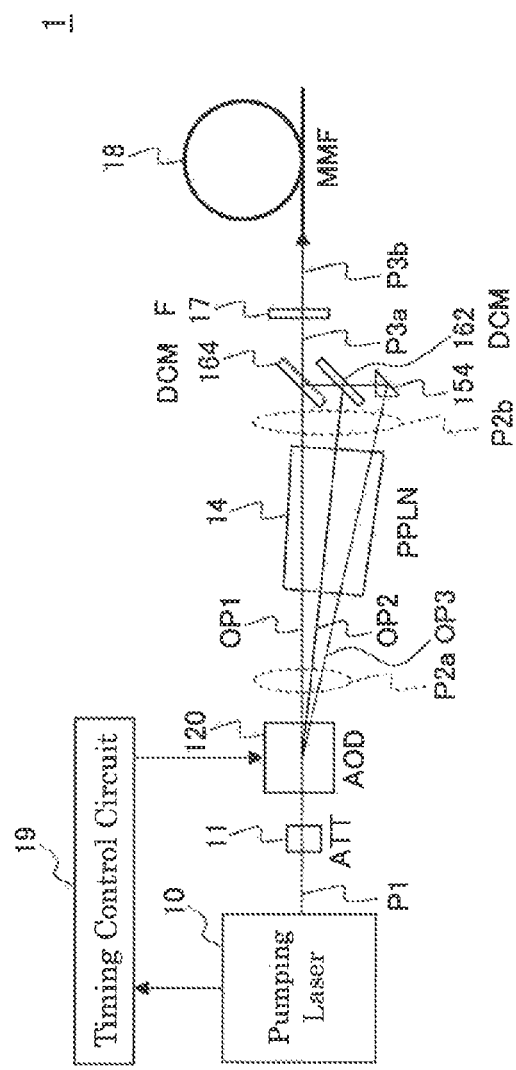
FIG. 6 shows a configuration of the laser beam output apparatus 1 according to the third embodiment.
Figure 7:
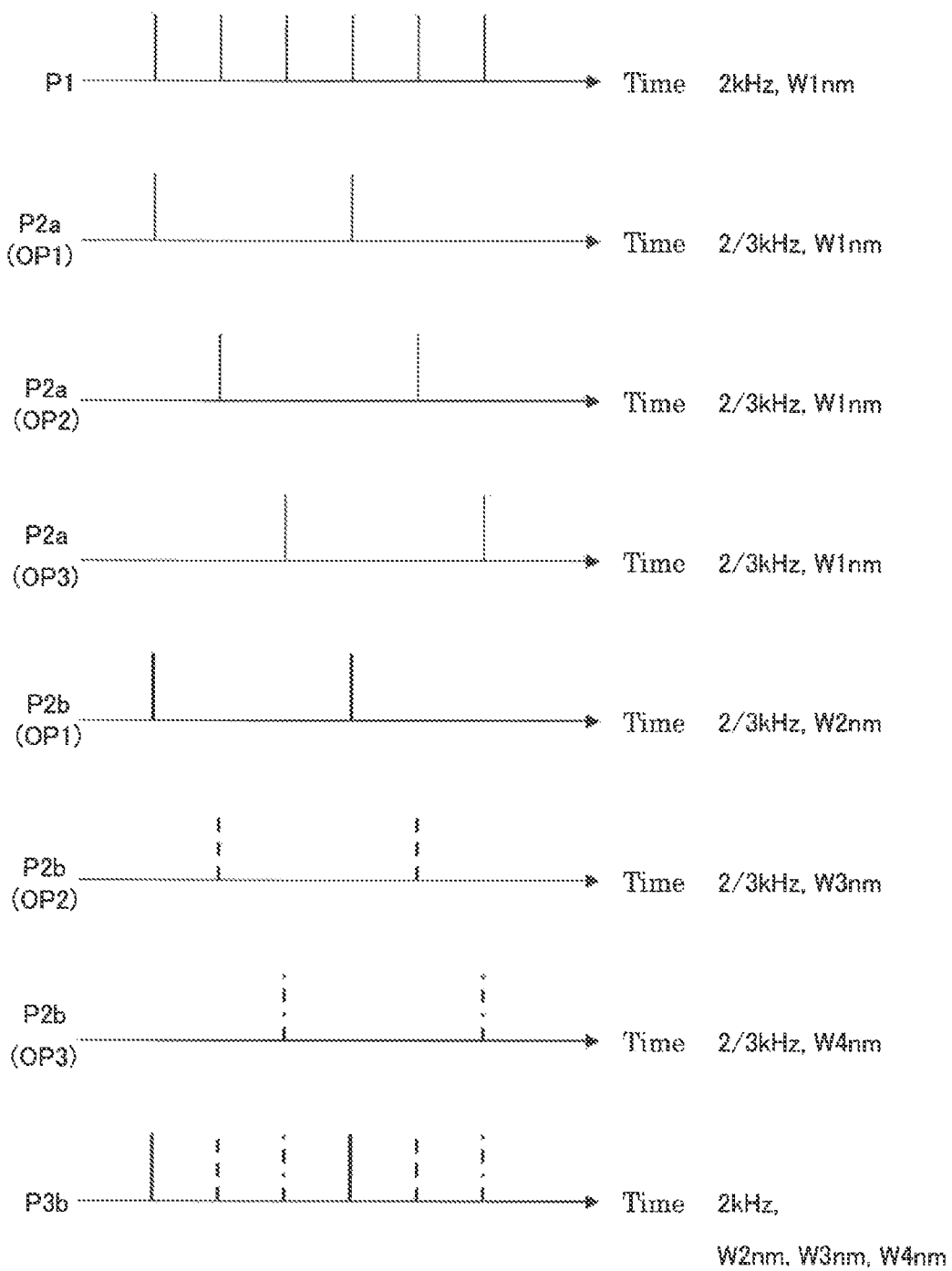
FIG. 7 shows timing charts of first pulses P1, second pulses (before wavelength conversion) P2a, second pulses (after wavelength conversion) P2b, and third pulses (after filtering) P3b according to the third embodiment.

FIG. 6 shows a configuration of the laser beam output apparatus 1 according to the third embodiment. FIG. 7 shows timing charts of first pulses P1, second pulses (before wavelength conversion) P2a, second pulses (after wavelength conversion) P2b, and third pulses (after filtering) P3b according to the third embodiment. It is noted that in FIG. 7, the thickness and type (solid, broken, or alternate long and short dash) of lines indicating the pulses vary depending on the wavelength.

The laser beam output apparatus 1 according to the third embodiment includes a pumping laser (pulsed laser output section) 10, an optical attenuator (ATT) 11, an acousto-optical deflector (AOD) (optical path determining section) 120, a wavelength changing section (PPLN) 14, a mirror 154, a dichroic mirror (multiplexer) (DCM) 162, 164, a filter (F) 17, an optical fiber (MMF) 18, and a timing control circuit (timing control section) 19. Components identical to those in the first embodiment will hereinafter be designated by the same reference signs to omit the description thereof.

The pumping laser (pulsed laser output section) 10, the optical attenuator (ATT) 11, the filter (F) 17, the optical fiber (MMF) 18, and the timing control circuit (timing control section) 19 are identical to those in the first embodiment, and the description thereof will be omitted. Note, however, that the timing control circuit 19 controls the timing of the output from the acousto-optical deflector 120 (see FIG. 7).

The acousto-optical deflector (AOD) (optical path determining section) 120 is arranged to receive the first pulses P1 and determine one among multiple optical paths OP1, OP2, OP3 for each of the first pulses P1 for output.

For example, with reference to FIGS. 6 and 7, at the time the acousto-optical deflector 120 receives (1+3N)-numbered (1st, 4th, 7th . . . ) ones (where N represents an integer equal to or greater than 0) of the first pulses P1, no acoustic wave is provided to the acousto-optical deflector 120. The (1+3N)-numbered ones of the first pulses P1 then directly go straight through the acousto-optical deflector 120 (optical path OP1).

On the other hand, at the time the acousto-optical deflector 120 receives (2+3N)-numbered (2nd, 5th, 8th . . . ) ones of the first pulses P1, an acoustic wave (with an angular frequency ω2) is provided to the acousto-optical deflector 120. The (2+3N)-numbered ones of the first pulses P1 then go through the acousto-optical deflector 120 with some degree of diffraction (optical path OP2).

At the time the acousto-optical deflector 120 receives (3+3N)-numbered (3rd, 6th, 9th . . . ) ones of the first pulses P1, an acoustic wave (with an angular frequency ω3, which is different from ω2) is also provided to the acousto-optical deflector 120. The (3+3N)-numbered ones of the first pulses P1 then go through the acousto-optical deflector 120 with some degree of diffraction (optical path OP3). Note, however, that the angle between the optical path OP3 and the optical path OP1 (smaller than 90 degrees) is greater than the angle between the optical path OP2 and the optical path OP1 (smaller than 90 degrees).

It is noted that at the time the acousto-optical deflector 120 receives (1+3N)-numbered ones of the first pulses P1, an acoustic wave (with an angular frequency ω1, which is different from ω2 and ω3) may be provided to the acousto-optical deflector 120.

This causes the acousto-optical deflector 120 to output, respectively on the multiple optical paths OP1, OP2, OP3, second pulses (before wavelength conversion) P2a having a frequency (213 kHz) obtained by dividing the predetermined frequency (e.g. 2 kHz) by the number (three) of the multiple optical paths and having their respective 120-degree different phases.

The wavelength changing section (PPLN) 14 is arranged to receive light beams (i.e. second pulses P2a) traveling, respectively, through the multiple optical paths OP1, OP2, OP3 and changes the light beams to have their respective different wavelengths for output. The wavelength changing section 14 outputs second pulses (after wavelength conversion) P2b.

With reference to FIG. 7, the wavelength changing section 14 is arranged to receive and convert ones (wavelength W1 [nm]) of the second pulses P2a traveling through the optical path OP1 into second pulses P2b (wavelength W2 [nm]). The wavelength changing section 14 is also arranged to receive and convert ones (wavelength W1 [nm]) of the second pulses P2a traveling through the optical path OP2 into second pulses P2b (wavelength W3 [nm]). The wavelength changing section 14 is further arranged to receive and convert ones (wavelength W1 [nm]) of the second pulses P2a traveling through the optical path OP3 into second pulses P2b (wavelength W4 [nm]).

The wavelength changing section 14 has a configuration similar to that in the first embodiment and its variation (see FIGS. 2 and 4). Note, however, that polarization reversed sections 144 through which the second pulses P2a traveling through the optical path OP3 propagate are arranged at predetermined spacing D3 (where D3 is different from D1 and D2).

The mirror 154 is arranged to receive ones of the second pulses (after wavelength conversion) P2b traveling through the optical path OP3 and reflect them toward the dichroic mirror 162.

The dichroic mirror (multiplexer) (DCM) 162 is arranged to multiplex ones of the second pulses (after wavelength conversion) P2b traveling through the optical path OP2 and the reflected light beams from the mirror 154 (ones of the second pulses (after wavelength conversion) P2b traveling through the optical path OP3) and reflect them toward the dichroic mirror 164.

The dichroic mirror (multiplexer) (DCM) 164 is arranged to multiplex ones of the second pulses (after wavelength conversion) P2b traveling through the optical path OP1 and the light beams from the dichroic mirror 162 (multiplexing of ones of the second pulses (after wavelength conversion) P2b traveling through the optical path OP2 and the optical path OP3) and output third pulses (before filtering) P3a having a predetermined frequency 2 kHz).

Next will be described an operation according to the third embodiment.

The pumping laser 10 first outputs a laser beam having a predetermined wavelength W1 [nm] as first pulses P1 having a predetermined frequency (e.g. 2 kHz) (see FIG. 7). The first pulses P1 are attenuated through the optical attenuator 11 and provided to the acousto-optical deflector 120. The timing control circuit 19 controls the timing of the output from the acousto-optical deflector 120 (see FIG. 7).

At the time the acousto-optical deflector 120 receives (1+3N)-numbered (1st, 4th, 7th . . . ) ones of the first pulses P1, no acoustic wave is provided to the acousto-optical deflector 120. The (1+3N)-numbered ones of the first pulses P1 then directly go straight through the acousto-optical deflector 120 (optical path OP1). This causes light beams traveling through the optical path OP1 to be second pulses (before wavelength conversion) P2a having a frequency (⅔ kHz) obtained by dividing the predetermined frequency (e.g. 2 kHz) by the number (three) of the multiple optical paths.

At the time the acousto-optical deflector 120 receives (2+3N)-numbered (2nd, 5th, 8th . . . ) ones of the first pulses P1, an acoustic wave (with an angular frequency ω2) is provided to the acousto-optical deflector 120. The (2+3N)-numbered ones of the first pulses P1 then go through the acousto-optical deflector 120 with some degree of diffraction (optical path OP2). This causes light beams traveling through the optical path OP2 to be second pulses (before wavelength conversion) P2a having a frequency (⅔ kHz) obtained by dividing the predetermined frequency (e.g. 2 kHz) by the number (three) of the multiple optical paths.

At the time the acousto-optical deflector 120 receives (3+3N)-numbered (3rd, 6th, 9th . . . ) ones of the first pulses P1, an acoustic wave (with an angular frequency ω3) is provided to the acousto-optical deflector 120. The (3+3N)-numbered ones of the first pulses P1 then go through the acousto-optical deflector 120 with some degree of diffraction (optical path OP3). This causes light beams traveling through the optical path OP3 to be second pulses (before wavelength conversion) P2a having a frequency (⅔ kHz) obtained by dividing the predetermined frequency (e.g. 2 kHz) by the number (three) of the multiple optical paths.

In addition, the phase of the light beams traveling through the optical path OP1 (second pulses (before wavelength conversion) P2a) is 120-degree different from the phase of the light beams traveling through the optical path OP2 (second pulses (before wavelength conversion) P2a). The phase of the light beams traveling through the optical path OP2 (second pulses (before wavelength conversion) P2a) is 120-degree different from the phase of the light beams traveling through the optical path OP3 (second pulses (before wavelength conversion) P2a). The phase of the light beams traveling through the optical path OP1 (second pulses (before wavelength conversion) P2a) is 240-degree different from the phase of the light beams traveling through the optical path OP3 (second pulses (before wavelength conversion) P2a).

The light beams traveling through the optical path OP1 (second pulses (before wavelength conversion) P2a, with a wavelength W1 [nm]) propagate through the polarization reserved sections 144, which are arranged at the predetermined spacing D1 in the wavelength changing section 14, to undergo wavelength conversion into W2 [nm] and provided to the dichroic mirror 164 as second pulses (after wavelength conversion) P2b.

The light beams traveling through the optical path OP2 (second pulses (before wavelength conversion) P2a, with a wavelength W1 [nm]) propagate through the polarization reserved sections 144, which are arranged at the predetermined spacing D2 in the wavelength changing section 14, to undergo wavelength conversion into W3 [nm], and reflected by the dichroic mirror 162 and provided to the dichroic mirror 164 as second pulses (after wavelength conversion) P2b.

The light beams traveling through the optical path OP3 (second pulses (before wavelength conversion) P2a, with a wavelength W1 [nm]) propagate through the polarization reserved sections 144, which are arranged at the predetermined spacing D3 in the wavelength changing section 14, to undergo wavelength conversion into W4 [nm], and reflected by the mirror 154 and provided to the dichroic mirror 164 via the dichroic mirror 162 as second pulses (after wavelength conversion) P2b.

Ones of the second pulses (after wavelength conversion) P2b output from the wavelength changing section 14 and having the wavelength W2 [nm], the wavelength W3 [nm], and the wavelength W4 [nm] are multiplexed through the dichroic mirror 164 to be third pulses (before filtering) P3a having a predetermined frequency (2 kHz).

The third pulses (before filtering) P3a undergo removal of the pump beam and the idler beam through the filter 17 to be third pulses (after filtering) P3b. The third pulses (after filtering) P3b is provided at one end of the optical fiber 18 for output at the other end.

In accordance with the third embodiment, the acousto-optical deflector 120 is used instead of the acousto-optical modulator 12, whereby the number of multiple optical paths can be increased to three (optical paths OP1, OP2, OP3). The third pulses (after filtering) P3b thus provides for irradiation with pulsed light of the wavelength W2 [nm] and immediately thereafter (e.g. after 500 microseconds) irradiation with pulsed light of the different wavelength W3 [nm]. It further provides for irradiation with pulsed light of the wavelength W3 [nm] and immediately thereafter (e.g. after 500 microseconds) irradiation with pulsed light of the further different wavelength W4 [nm]. That is, the third embodiment allows for irradiation with pulsed light of one wavelength, immediately thereafter irradiation with pulsed light of another wavelength, and immediately thereafter irradiation with pulsed light of a further wavelength. The third embodiment thus allows for irradiation with pulsed light of three wavelengths.

It is noted that the number of multiple optical paths may be four or more, though three in the above-described third embodiment. This allows for irradiation with pulsed light of four or more wavelengths.

Also, in the third embodiment, like the first embodiment, there is only one LN crystal substrate 142, all of the polarization reversed sections 144 are formed in the single LN crystal substrate 142. However, LN crystal substrates may be provided, respectively for the light beams (traveling through the optical path OP1, the optical path OP2, and the optical path OP3) that propagate therethrough, as is the case in the second embodiment.

Fourth Embodiment

A laser beam output apparatus 1 according to a fourth embodiment is arranged for irradiation with "multiple" pulses of light of one wavelength W2 [nm] (within a predetermined temporal range TR1) and immediately thereafter irradiation with "multiple" pulses of light of another wavelength W3 [nm] (within a predetermined temporal range TR2) (see P3b in FIG. 9), which differs from the first embodiment in which irradiation is provided with "one" pulse of light of one wavelength W2 [nm] and immediately thereafter "one" pulse of light of another wavelength W3 [nm] (see P3b in FIG. 3).

The laser beam output apparatus 1 according to the fourth embodiment is also arranged such that the first pulses P1 have a non-constant frequency, which differs from the first embodiment in which the first pulses P1 have a constant frequency (e.g. 2 kHz).

Figure 8:
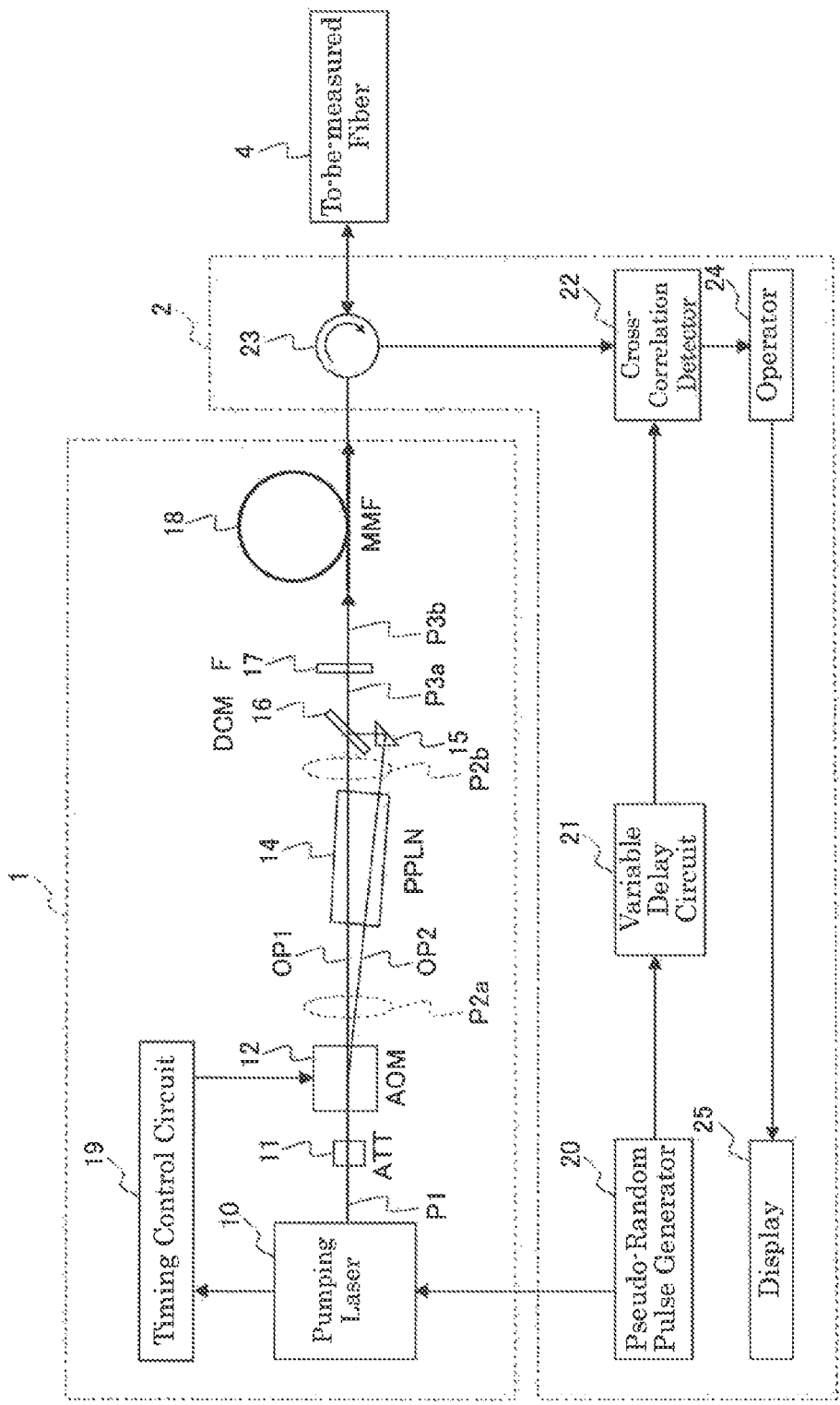
FIG. 8 shows a configuration of the laser beam output apparatus 1 according to the fourth embodiment.
Figure 9:
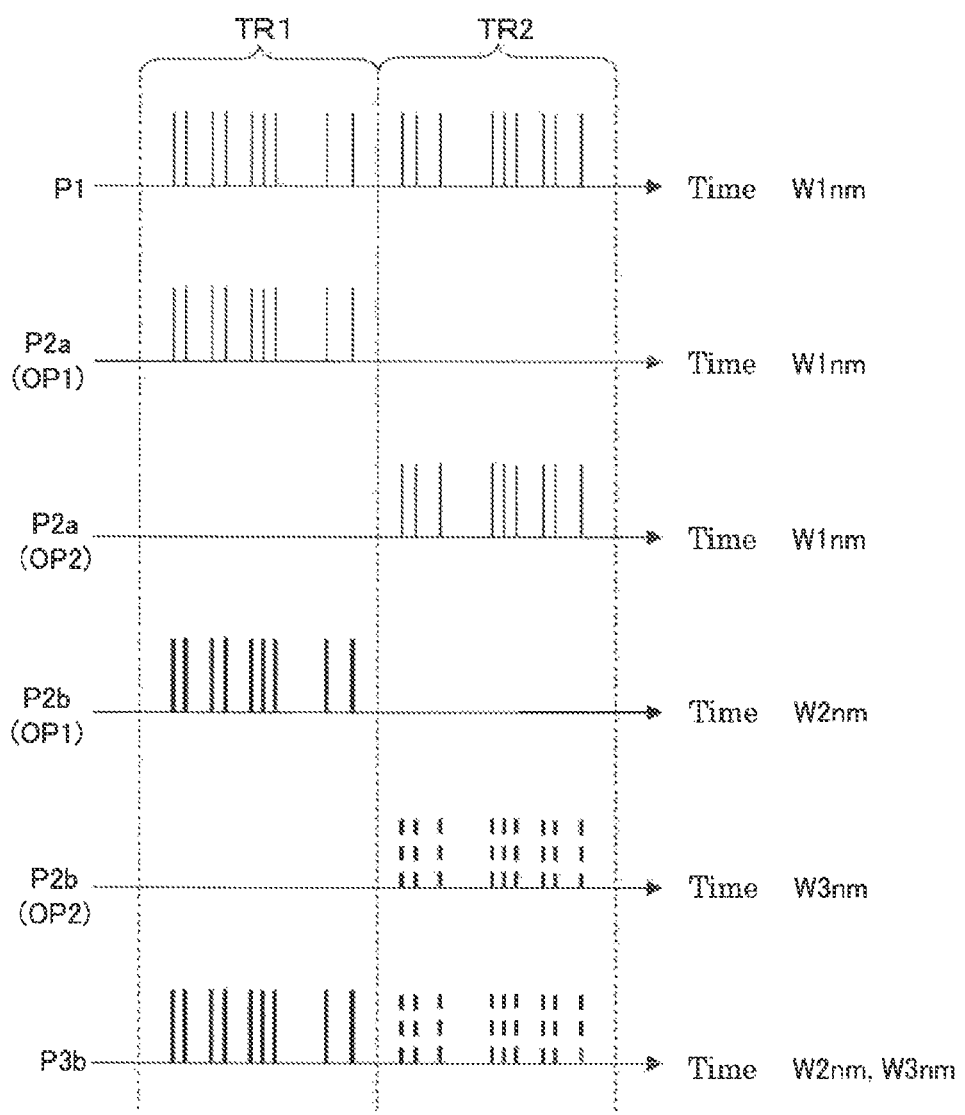
FIG. 9 shows timing charts of first pulses P1, second pulses (before wavelength conversion) P2a, second pulses (after wavelength conversion) P2b, and third pulses (after filtering) P3b according to the fourth embodiment.

FIG. 8 shows a configuration of the laser beam output apparatus 1 according to the fourth embodiment. FIG. 9 shows timing charts of first pulses P1, second pulses (before wavelength conversion) P2a, second pulses (after wavelength conversion) P2b, and third pulses (after filtering) P3b according to the fourth embodiment. It is noted that in FIG. 9, the thickness and type (solid or broken) of lines indicating the pulses vary depending on the wavelength.

The laser beam output apparatus 1 according to the fourth embodiment includes a pumping laser (pulsed laser output section) 10, an optical attenuator (ATT) 11, an acousto-optical modulator (optical path determining section) (AOM) 12, a wavelength changing section (PPLN) 14, a mirror 15, a dichroic mirror (multiplexer) (DCM) 16, a filter (F) 17, an optical fiber (MMF) 18, and a timing control circuit (timing control section) 19.

The laser beam output apparatus 1 according to the fourth embodiment is intended to measure a to-be-measured fiber 4, an optical fiber to be measured, through OTDR. The laser beam output apparatus 1 is connected to the to-be-measured fiber 4 through measuring equipment 2.

The pumping laser (pulsed laser output section) 10 is arranged to output a laser beam having a predetermined wavelength W1 [nm] as first pulses P1 (see FIG. 9). The pumping laser 10 is, for example, a Yb:YAG laser. With reference to FIG. 9, the first pulses P1 are from a pseudo-random signal (e.g. M-sequence signal) output for each of the predetermined temporal ranges TR1, TR2. It is noted that the length of the predetermined temporal ranges TR1, TR2 corresponds to one cycle of the M-sequence signal. It is further noted that unlike the first to third embodiments, the first pulses P1 are from a pseudo-random signal and thereby have a non-constant frequency.

The optical attenuator (ATT) 11, the mirror 15, the dichroic mirror (multiplexer) (DCM) 16, the filter (F) 17, the optical fiber (MMF) 18, and the timing control circuit (timing control section) 19 are identical to those in the first embodiment, and the description thereof will be omitted.

The configuration of the wavelength changing section 14 is identical to that in the first embodiment (see FIG. 2) or its variation (see FIG. 4), and the description thereof will be omitted.

The acousto-optical modulator (optical path determining section) (AOM) 12 is arranged to receive the first pulses P1 and determine one among multiple optical paths OP1, OP2 for each of the first pulses P1 for output.

For example, with reference to FIGS. 8 and 9, at the time the acousto-optical modulator 12 receives multiple ones of the first pulses P1 within the predetermined temporal range TR1, no acoustic wave is provided to the acousto-optical modulator 12. The multiple ones of the first pulses P1 within the predetermined temporal range TR1 then directly go straight through the acousto-optical modulator 12 (optical path OP1).

On the other hand, at the time the acousto-optical modulator 12 receives multiple ones of the first pulses P1 within the predetermined temporal range TR2, an acoustic wave (with an angular frequency ω2) is provided to the acousto-optical modulator 12. The multiple ones of the first pulses P1 within the predetermined temporal range TR2 then go through the acousto-optical modulator 12 with some degree of diffraction (optical path OP2).

Note, however, that at the time the acousto-optical modulator 12 receives multiple ones of the first pulses P1 within the predetermined temporal range TR1, an acoustic wave (with an angular frequency ω1, which is different from ω2) may be provided to the acousto-optical modulator 12.

This causes the acousto-optical modulator 12 to output, respectively on the multiple optical paths OP1, OP2, second pulses (before wavelength conversion) P2a among the first pulses P1 within the predetermined temporal ranges TR1, TR2, the predetermined temporal ranges differing from (not overlapping) each other.

That is, the acousto-optical modulator 12 outputs, on the optical path OP1, multiple ones of the first pulses P1 within the predetermined temporal range TR1 (see P2a (OP1) in FIG. 9). The acousto-optical modulator 12 further outputs, on the optical path OP2, multiple ones of the first pulses P1 within the predetermined temporal range TR2 (see P2a (OP2) in FIG. 9). The second pulses P2a traveling through the optical path OP1 (P2a (OP1)) and the second pulses P2a traveling through the optical path OP2 (P2a (OP2)) have their respective different predetermined temporal ranges (not overlapping each other).

The wavelength changing section (PPLN) 14 is arranged to receive light beams (i.e. second pulses P2a) traveling, respectively, through the multiple optical paths OP1, OP2 and changes the light beams to have their respective different wavelengths for output. The wavelength changing section 14 outputs second pulses (after wavelength conversion) P2b.

With reference to FIG. 9, the wavelength changing section 14 is arranged to receive and convert ones (wavelength W1 [nm]) of the second pulses P2a traveling through the optical path OP1 into second pulses P2b (wavelength W2 [nm]). The wavelength changing section 14 is also arranged to receive and convert ones (wavelength W1 [nm]) of the second pulses P2a traveling through the optical path OP2 into second pulses P2b (wavelength W3 [nm]).

The measuring equipment 2 has a pseudo-random pulse generator 20, a variable delay circuit 21, a cross-correlation detector 22, a circulator 23, an operator 24, and a display 25. The measuring equipment 2 is intended to measure the to-be-measured fiber 4 through OTDR.

The pseudo-random pulse generator 20 is arranged to generate a pseudo-random pulse RP. The timing of the output of the pseudo-random pulse RP is the same as the timing of the output of the first pulses P1. The pumping laser 10 is arranged to output the first pulses P1 in synchronization with the timing of the output of the pseudo-random pulse RP. The pseudo-random pulse generator 20 is arranged to provide the pseudo-random pulse RP to the pumping laser 10 and the variable delay circuit 21.

The variable delay circuit 21 is arranged to receive and delay the pseudo-random pulse RP (the delay time is variable) and provide it to the cross-correlation detector 22.

The cross-correlation detector 22 is arranged to receive the pseudo-random pulse RP from the variable delay circuit 21 and also reflected light and scattered light from the to-be-measured fiber 4 via the circulator 23 to detect cross-correlation.

The circulator 23 is connected to the other end of the optical fiber (MMF) 18, the input end of the to-be-measured fiber 4, and the cross-correlation detector 22. The circulator 23 is arranged to provide third pulses P3b output from the other end of the optical fiber (MMF) 18 to the input end of the to-be-measured fiber 4. The circulator 23 is arranged to receive reflected light and scattered light from the to-be-measured fiber 4 via the input end of the to-be-measured fiber 4 and provide them to the cross-correlation detector 22.

The operator 24 is arranged to compute the distance between a portion (e.g. disconnection site) of the to-be-measured fiber 4 at which the reflected light and the scattered light are generated and the input end of the to-be-measured fiber 4 based on the cross-correlation detected by the cross-correlation detector 22.

The display 25 is arranged to display the result of computation the operator 24.

Next will be described an operation according to the fourth embodiment.

The pseudo-random pulse generator 20 first provides a pseudo-random pulse RP to the pumping laser 10. The pumping laser 10 outputs a laser beam having a predetermined wavelength W1 [nm] as first pulses P1 (see FIG. 9) in synchronization with the timing of the output of the pseudo-random pulse RP. The first pulses P1 are attenuated through the optical attenuator 11 and provided to the acousto-optical modulator 12. The timing control circuit 19 controls the timing of the output from the acousto-optical modulator 12 (see FIG. 9).

At the time the acousto-optical modulator 12 receives multiple ones of the first pulses P1 within the predetermined temporal range TR1, no acoustic wave is provided to the acousto-optical modulator 12. The multiple ones of the first pulses P1 within the predetermined temporal range TR1 then directly go straight through the acousto-optical modulator 12 (optical path OP1).

At the time the acousto-optical modulator 12 receives multiple ones of the first pulses P1 within the predetermined temporal range TR2, an acoustic wave (with an angular frequency ω2) is provided to the acousto-optical modulator 12. The multiple ones of the first pulses P1 within the predetermined temporal range TR2 then go through the acousto-optical modulator 12 with some degree of diffraction (optical path OP2).

In addition, the light beams traveling through the optical path OP1 (second pulses (before wavelength conversion) P2a) is the first pulses P1 within the predetermined temporal range TR1, while the light beams traveling through the optical path OP2 (second pulses (before wavelength conversion) P2a) is the first pulses P1 within the predetermined temporal range TR2 (the predetermined temporal ranges differ from each other).

The light beams traveling through the optical path OP1 (second pulses (before wavelength conversion) P2a, with a wavelength W1 [nm]) propagate through the polarization reserved sections 144, which are arranged at the predetermined spacing D1 in the wavelength changing section 14, to undergo wavelength conversion into W2 [nm] and provided to the dichroic mirror 16 as second pulses (after wavelength conversion) P2b.

The light beams traveling through the optical path OP2 (second pulses (before wavelength conversion) P2a, with a wavelength W1 [nm]) propagate through the polarization reserved sections 144, which are arranged at the predetermined spacing D2 in the wavelength changing section 14, to undergo wavelength conversion into W3 [nm], and reflected by the mirror 15 and provided to the dichroic mirror 16 as second pulses (after wavelength conversion) P2b.

Ones of the second pulses (after wavelength conversion) P2b output from the wavelength changing section 14 and having the wavelength W2 [nm] and the wavelength W3 [nm] are multiplexed through the dichroic mirror 16 to be third pulses (before filtering) P3a having a predetermined frequency (2 kHz).

The third pulses (before filtering) P3a undergo removal of the pump beam and the idler beam through the filter 17 to be third pulses (after filtering) P3b. The third pulses (after filtering) P3b is provided at one end of the optical fiber 18 for output at the other end.

The third pulses P3b output from the other end of the optical fiber 18 is provided to the input end of the to-be-measured fiber 4 via the circulator 23. Scattered light and reflected light from the to-be-measured fiber 4 are provided to the cross-correlation detector 22 via the circulator 23 to undergo cross-correlation with the pseudo-random pulse RP. Based on the cross-correlation, the distance between a portion (e.g. disconnection site) of the to-be-measured fiber 4 at which the reflected light and the scattered light are generated and the input end of the to-be-measured fiber 4 is computed by the operator 24 and displayed on the display 25.

In accordance with the fourth embodiment, the third pulses (after filtering) P3b can be output from the optical fiber 18. The third pulses (after filtering) P3b provides for irradiation with multiple pulses of light of the wavelength W2 [nm] and immediately thereafter multiple irradiation with pulses of light of the different wavelength W3 [nm]. That is, the fourth embodiment allows for irradiation with pulsed light of one wavelength and immediately thereafter irradiation with pulsed light of another wavelength.

Fifth Embodiment

In the fifth embodiment, a to-be-measured object (e.g. aerosol) is measured through LIDAR, which differs from the fourth embodiment in which the to-be-measured fiber 4 is measured through OTDR.

Figure 10:
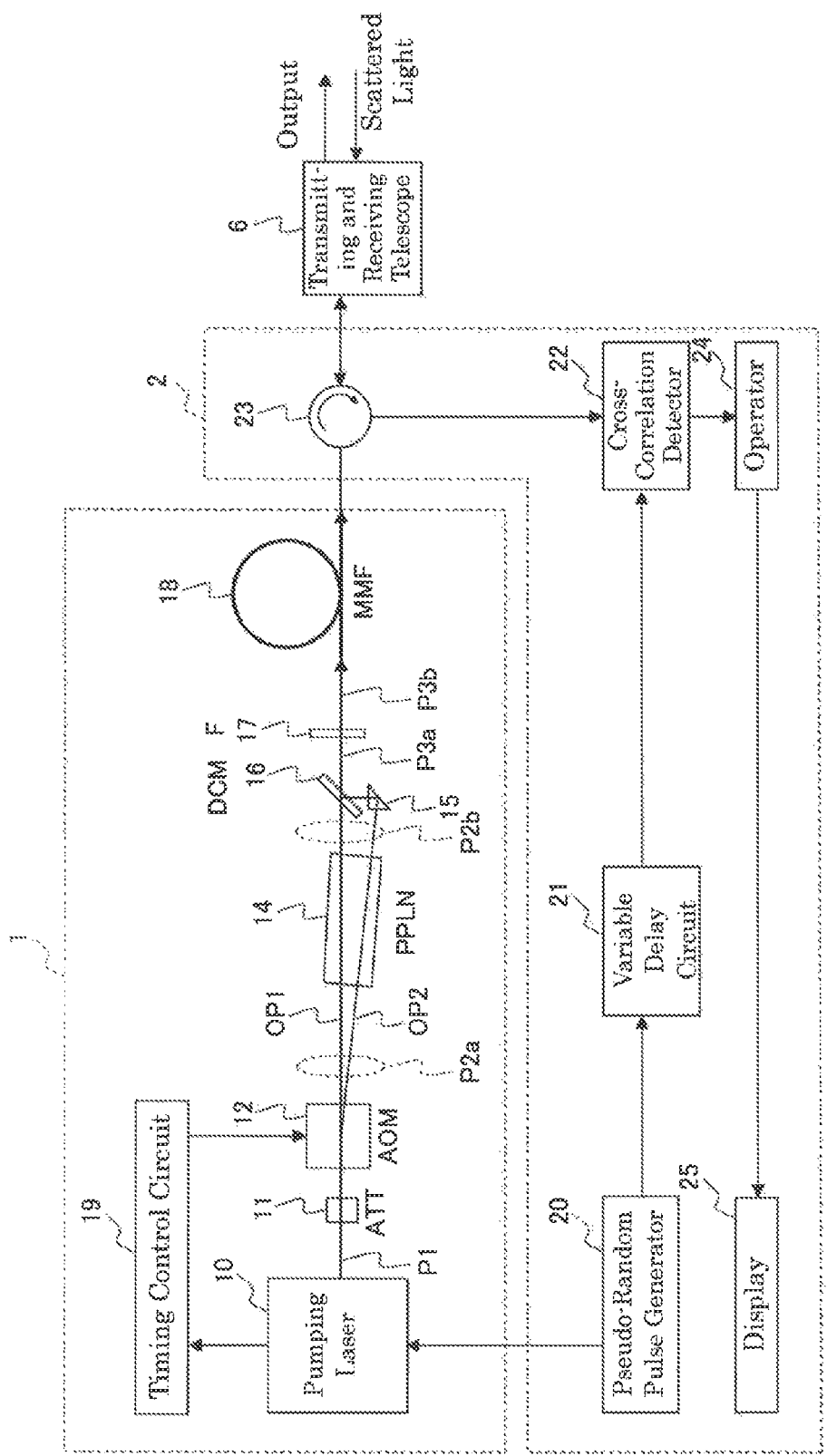
FIG. 10 shows a configuration of the laser beam output apparatus 1 according to the fifth embodiment.

FIG. 10 shows a configuration of the laser beam output apparatus 1 according to the fifth embodiment. It is noted that the timing charts of first pulses P1, second pulses (before wavelength conversion) P2a, second pulses (after wavelength conversion) P2b, and third pulses (after filtering) P3b according to the fifth embodiment are identical to those in the fourth embodiment, and the description thereof will be omitted (see FIG. 9).

The laser beam output apparatus 1 according to the fifth embodiment is intended to measure a to-be-measured object (e.g. aerosol) through LIDAR. The laser beam output apparatus 1 is connected to a transmitting and receiving telescope 6 through measuring equipment 2.

The laser beam output apparatus 1 according to the fifth embodiment includes a pumping laser (pulsed laser output section) 10, an optical attenuator (ATT) 11, an acousto-optical modulator (optical path determining section) (AOM) 12, a wavelength changing section (PPLN) 14, a mirror 15, a dichroic mirror (multiplexer) (DCM) 16, a filter (F) 17, an optical fiber (MMF) 18, and a timing control circuit (timing control section) 19. Since these are identical to those in the fourth embodiment, the description thereof will be omitted.

The measuring equipment 2 has a pseudo-random pulse generator 20, a variable delay circuit 21, a cross-correlation detector 22, a circulator 23, an operator 24, and a display 25. Since the pseudo-random pulse generator 20, the variable delay circuit 21, the cross-correlation detector 22, the operator 24, and the display 25 are identical to those in the fourth embodiment, the description thereof will be omitted.

The circulator 23 is connected to the other end of the optical fiber (MMF) 18, the transmitting and receiving telescope 6, and the cross-correlation detector 22. The circulator 23 is arranged to provide third pulses P3b output from the other end of the optical fiber (MMF) 18 to the transmitting and receiving telescope 6. The circulator 23 is arranged to receive scattered light from the to-be-measured object via the transmitting and receiving telescope 6 and provide it to the cross-correlation detector 22.

The transmitting and receiving telescope 6 is arranged to receive third pulses P3b output from the other end of the optical fiber 18 via the circulator 23 and provide them to the to-be-measured object. The transmitting and receiving telescope 6 is further arranged to receive scattered light from the to-be-measured object and provide it to the cross-correlation detector 22 via the circulator 23.

Next will be described an operation according to the fifth embodiment.

Since the operations until the output of third pulses P3b from the other end of the optical fiber 18 are identical to those in the fourth embodiment, the description thereof will be omitted.

The third pulses P3b output from the other end of the optical fiber 18 is provided to the transmitting and receiving telescope 6 via the circulator 23. When the third pulses P3b are provided from the transmitting and receiving telescope 6 to the to-be-measured object (e.g. aerosol), scattered light from the to-be-measured object is provided to the transmitting and receiving telescope 6. The scattered light is provided to the cross-correlation detector 22 via the circulator 23 to undergo cross-correlation with the pseudo-random pulse RP. Based on the cross-correlation, the distance between the transmitting and receiving telescope 6 and a site at which the scattered light is generated is computed by the operator 24 and displayed on the display 25. It is noted that based on the distance computed by the operator 24, the type of aerosol can also be identified by a differential absorption method.

The fifth embodiment exhibits the same advantageous effects as the fourth embodiment.

Sixth Embodiment

The laser beam output apparatus 1 according to the sixth embodiment differs from the laser beam output apparatus 1 according to the third embodiment mainly in that an optical path determining section (a first acousto-optical modulator (AOM) 12a and a second acousto-optical modulator (AOM) 12b) is used instead of the acousto-optical deflector (AOD) (optical path determining section) 120.

Figure 11:
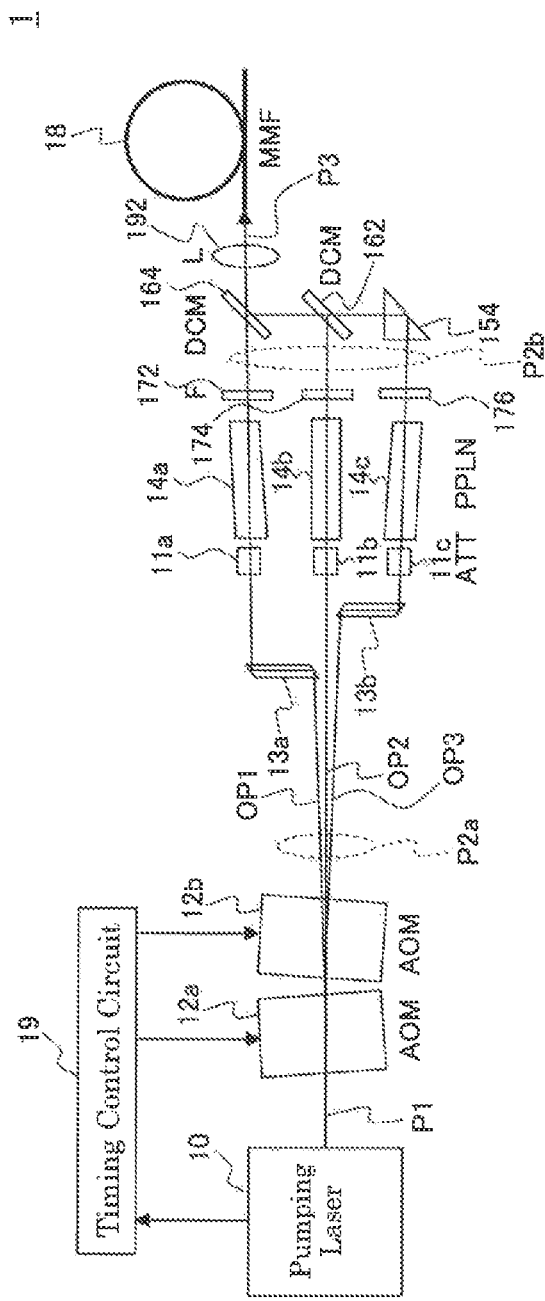
FIG. 11 shows a configuration of the laser beam output apparatus 1 according to the sixth embodiment.
Figure 12:
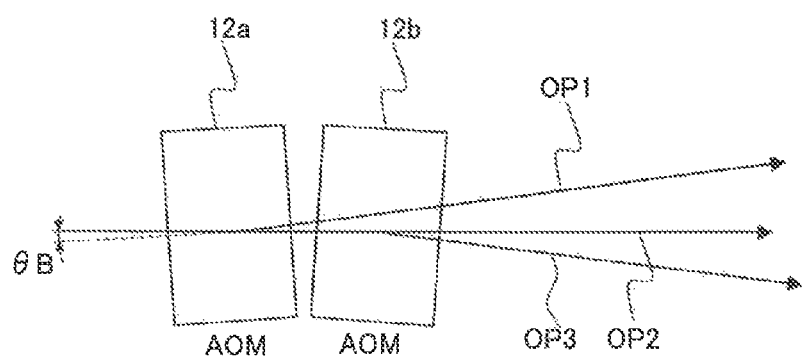
FIG. 12 is an enlarged view around the optical path determining section (the first acousto-optical modulator (AOM) 12a and the second acousto-optical modulator (AOM) 12b) in the laser beam output apparatus 1 according to the sixth embodiment.

FIG. 11 shows a configuration of the laser beam output apparatus 1 according to the sixth embodiment. FIG. 12 is an enlarged view around the optical path determining section (the first acousto-optical modulator (AOM) 12a and the second acousto-optical modulator (AOM) 12b) in the laser beam output apparatus 1 according to the sixth embodiment.

The laser beam output apparatus 1 according to the sixth embodiment includes a pumping laser (pulsed laser output section) 10, optical attenuators (ATT) 11a, 11b, 11c, a first acousto-optical modulator (AOM) 12a, a second acousto-optical modulator (AOM) 12b, rhomboid prisms 13a, 13b, wavelength changing sections (PPLN) 14a, 14b, 14c, a mirror 154, dichroic mirrors (multiplexers) (DCM) 162, 164, filters (F) 172, 174, 176, an optical fiber (MMF) 18, a tuning control circuit (timing control section) 19, and a lens (L) 192. Components identical to those in the third embodiment will hereinafter be designated by the same reference signs to omit the description thereof.

The pumping laser (pulsed laser output section) 10, the mirror 154, the dichroic mirrors (multiplexers) (DCM) 162, 164, the optical fiber (MMF) 18, and the timing control circuit (timing control section) 19 are identical to those in the third embodiment, and the description thereof will be omitted. Note, however, that the optical fiber (MMF) 18 is arranged to receive, at one end thereof the third pulses P3 output from the dichroic mirror 164 via the lens (L) 192 for output at the other end thereof. Note further that the timing control circuit 19 is arranged to control the timing of the output from the optical path determining section (the first acousto-optical modulator (AOM) 12a and the second acousto-optical modulator (AOM) 12b) (see P2a in FIG. 7).

The optical path determining section has the first acousto-optical modulator (AOM) 12a and the second acousto-optical modulator (AOM) 12b. Both the first acousto-optical modulator (AOM) 12a and the second acousto-optical modulator (AOM) 12b have a rectangular planar shape.

One of the longer sides of the first acousto-optical modulator (AOM) 12a receives the first pulses P1. The shorter sides of the first acousto-optical modulator (AOM) 12a are inclined θB (Bragg's angle) counterclockwise with respect to the optical path OP2.

One of the longer sides of the second acousto-optical modulator (AOM) 12b receives the output from the first acousto-optical modulator (AOM) 12a. The shorter sides of the second acousto-optical modulator (AOM) 12b are inclined OB (Bragg's angle) clockwise with respect to the optical path OP2.

The first acousto-optical modulator (AOM) 12a is arranged to receive the first pulses P1 and determine one among multiple optical paths OP1, OP2 for each of the first pulses P1 for output. In the sixth embodiment, the first acousto-optical modulator (AOM) 12a is arranged to diffract (optical path OP1) or directly advance (optical path OP2) each of the first pulses P1 for output.

The second acousto-optical modulator (AOM) 12b is arranged to receive the output from the first acousto-optical modulator 12a and determine one among one or more optical paths OP1, OP2, OP3 for each of the pulses of the output from the first acousto-optical modulator 12a for output. In the sixth embodiment, the second acousto-optical modulator (AOM) 12b is arranged to receive and diffract (optical path OP3) or directly advance (optical path OP2) the directly advanced ones (optical path OP2) of the first pulses for output, while receive and directly advance (optical path OP1) the diffracted ones (optical path OP1) of the first pulses for output.

It is noted that the timing charts of first pulses P1, second pulses (before wavelength conversion) P2a, second pulses (after wavelength conversion) P2b, and third pulses P3 (input to the optical fiber (MMF) 18) according to the sixth embodiment are identical to those in FIG. 7 (where P3b in FIG. 7 should be read P3).

For example, with reference to FIGS. 12 and 7, at the time the optical path determining section receives (1+3N)-numbered (1st, 4th, 7th . . . ) ones (where N represents an integer equal to or greater than 0) of the first pulses P1, an acoustic wave is provided to the first acousto-optical modulator (AOM) 12a, while 110 acoustic wave is provided to the second acousto-optical modulator (AOM) 12b. The (1+3N)-numbered ones of the first pulses P1 then travel through the optical path OP1 (see FIG. 12).

At the time the optical path determining section receives (2+3N)-numbered (2nd, 5th, 8th . . . ) ones of the first pulses P1, no acoustic wave is provided to the first acousto-optical modulator (AOM) 12a and no acoustic wave is also provided to the second acousto-optical modulator (AOM) 12b. The (2+3N)-numbered ones of the first pulses P1 then travel through the optical path OP2 (see FIG. 12).

At the time the optical path determining section receives (3+3N)-numbered (3rd, 6th, 9th . . . ) ones of the first pulses P1, no acoustic wave is provided to the first acousto-optical modulator (AOM) 12a, while an acoustic wave is provided to the second acousto-optical modulator (AOM) 12b. The (3+3N)-numbered ones of the first pulses P1 then travel through the optical path OP3 (see FIG. 12).

This causes the optical path determining section to output, respectively on the multiple optical paths OP1, OP2, OP3, second pulses (before wavelength conversion) P2a having a frequency (⅔ kHz) obtained by dividing the predetermined frequency (e.g. 2 kHz) by the number (three) of the multiple optical paths and having their respective 120-degree different phases.

The rhomboid prism 13a is arranged to receive ones of the second pulses (before wavelength conversion) P2a traveling through the optical path OP1 and change the optical path in parallel away from the optical path OP1. The rhomboid prism 13b is arranged to receive ones of the second pulses (before wavelength conversion) P2a traveling through the optical path OP3 and change the optical path in parallel away from the optical path OP3.

The optical attenuators (ATT) 11a, 11b, 11c are arranged to attenuate therethrough, respectively the light beams traveling through the optical path OP1 (output from the rhomboid prism 13a), the light beams traveling through the optical path OP2, and the light beams traveling through the optical path OP3 (output from the rhomboid prism 13b) and provide them, respectively, to the wavelength changing sections (PPLN) 14a, 14b, 14c.

Since the wavelength changing sections (PPLN) 14a, 14b are identical to those in the second embodiment, the description thereof will be omitted. The wavelength changing section (PPLN) 14c is arranged to receive from the rhomboid prism 13b and convert ones (wavelength W1 [nm]) of the second pulses P2a traveling through the optical path OP3 into second pulses P2b (wavelength W4 [nm]). The arrangement of the wavelength changing section 14b corresponds to the polarization reversed sections 144 arranged at the predetermined spacing D2 (where the predetermined spacing D2 should be read D3) and the LN crystal substrate 142 in which the polarization reversed sections 144 are formed as shown in FIG. 2 or 4.

It is noted that the LN crystal substrate that the wavelength changing section 14a has, the LN crystal substrate that the wavelength changing section 14b has, and the LN crystal substrate that the wavelength changing section 14c has are not identical to each other. That is, the LN crystal substrate that the wavelength changing section 14a has, the LN crystal substrate that the wavelength changing section 14b has, and the LN crystal substrate that the wavelength changing section 14c has are provided, respectively, for the light beams (traveling through the optical path OP1, the optical path OP2, and the optical path OP3) that propagate therethrough.

The filters (F) 172, 174, 176 are arranged to remove the pump beam and the idler beam from the outputs from the wavelength changing sections (PPLN) 14a, 14b, 14c for output to the dichroic mirrors (multiplexers) (DCM) 164, 162 and the mirror 154.

The lens (L) 192 is arranged to receive the output from the dichroic mirror (multiplexer) (DCM) 164 and provide it to the optical fiber (MMF) 18.

Next will be described an operation according to the sixth embodiment.

The pumping laser 10 first outputs a laser beam having a predetermined wavelength W1 [nm] as first pulses P1 having a predetermined frequency (e.g. 2 kHz) (see FIG. 7). The first pulses P1 are provided to the first acousto-optical modulator (AOM) 12a of the optical path determining section. The timing control circuit 19 controls the timing of the output from the optical path determining section (see P2a in FIG. 7).

At the time the optical path determining section receives (1+3N)-numbered (1st, 4th, 7th . . . ) ones (where N represents an integer equal to or greater than 0) of the first pulses P1, an acoustic wave is provided to the first acousto-optical modulator (QOM) 12a, while no acoustic wave is provided to the second acousto-optical modulator (AOM) 12b. The (1+3N)-numbered ones of the first pulses P1 then travel through the optical path OP1 (see FIG. 12). This causes light beams traveling through the optical path OP1 to be second pulses (before wavelength conversion) P2a having a frequency (⅔ kHz) obtained by dividing the predetermined frequency (e.g. 2 kHz) by the number (three) of the multiple optical paths (see FIG. 7).

At the time the optical path determining section receives (2+3N)-numbered (2nd, 5th, 8th . . . ) ones of the first pulses P1, no acoustic wave is provided to the first acousto-optical modulator (AOM) 12a and no acoustic wave is also provided to the second acousto-optical modulator (AOM) 12b. The (2+3N)-numbered ones of the first pulses P1 then travel through the optical path OP2 (see FIG. 12). This causes light beams traveling through the optical path OP2 to be second pulses (before wavelength conversion) P2a having a frequency (⅔ kHz) obtained by dividing the predetermined frequency (e.g. 2 kHz) by the number (three) of the multiple optical paths (see FIG. 7).

At the time the optical path determining section receives (3+3N)-numbered (3rd, 6th, 9th . . . ) ones of the first pulses P1, no acoustic wave is provided to the first acousto-optical modulator (AOM) 12a, while an acoustic wave is provided to the second acousto-optical modulator (AOM) 12b. The (3+3N)-numbered ones of the first pulses P1 then travel through the optical path OP3 (see FIG. 12). This causes light beams traveling through the optical path OP3 to be second pulses (before wavelength conversion) P2a having a frequency (⅔ kHz) obtained by dividing the predetermined frequency (e.g. 2 kHz) by the number (three) of the multiple optical paths (see FIG. 7).

In addition, the phase of the light beams traveling through the optical path OP1 (second pulses (before wavelength conversion) P2a) is 120-degree different from the phase of the light beams traveling through the optical path OP2 (second pulses (before wavelength conversion) P2a). The phase of the light beams traveling through the optical path OP2 (second pulses (before wavelength conversion) P2a) is 120-degree different from the phase of the light beams traveling through the optical path OP3 (second pulses (before wavelength conversion) P2a). The phase of the light beams traveling through the optical path OP1 (second pulses (before wavelength conversion) P2a) is 240-degree different from the phase of the light beams traveling through the optical path OP3 (second pulses (before wavelength conversion) P2a).

The light beams traveling through the optical path OP1 (second pulses (before wavelength conversion) P2a, with a wavelength W1 [nm]) undergo a change in the optical path through the rhomboid prism 13a to be attenuated through the optical attenuator (ATT) 11a and provided to the wavelength changing section (PPLN) 14a. Further, the light beams provided to the wavelength changing section (PPLN) 14a propagate through the polarization reserved sections 144, which are arranged at the predetermined spacing D1 in the wavelength changing section 14a, to undergo wavelength conversion into W2 [nm] to be second pulses (after wavelength conversion) P2b, and then undergo removal of the pump beam and the idler beam through the filter (F) 172 to be provided to the dichroic mirror 164.

The light beams traveling through the optical path OP2 (second pulses (before wavelength conversion) P2a, with a wavelength W1 [nm]) are attenuated through the optical attenuator (ATT) 11b and provided to the wavelength changing section (PPLN) 14b. Further, the light beams provided to the wavelength changing section (PPLN) 1.4b propagate through the polarization reserved sections 144, which are arranged at the predetermined spacing D2 in the wavelength changing section 14b, to undergo wavelength conversion into W3 [nm] to be second pulses (after wavelength conversion) P2b, and then undergo removal of the pump beam and the idler beam through the filter (F) 174 to be reflected by the dichroic mirror 162 and provided to the dichroic mirror 164.

The light beams traveling through the optical path OP3 (second pulses (before wavelength conversion) P2a, with a wavelength W1 [nm]) undergo a change in the optical path through the rhomboid prism 13b to be attenuated through the optical attenuator (ATT) 11c and provided to the wavelength changing section (PPLN) 14c. Further, the light beams provided to the wavelength changing section (PPLN) 14c propagate through the polarization reserved sections 144, which are arranged at the predetermined spacing D3 in the wavelength changing section 14c, to undergo wavelength conversion into W4 [nm] to be second pulses (after wavelength conversion) P2b, and then undergo removal of the pump beam and the idler beam through the filter (F) 176 to be reflected by the mirror 154 and provided to the dichroic mirror 164 via the dichroic mirror 162.

Ones of the second pulses (after wavelength conversion) P2b output from the wavelength changing sections 14a, 14b, 14c and having the wavelength W2 [nm], the wavelength W3 [nm], and the wavelength W4 [nm] are multiplexed through the dichroic mirror 164 to be third pulses P3 having a predetermined frequency (2 kHz).

The third pulses P3 go through the lens (L) 192 and provided to the optical fiber (MMF) 18.

In accordance with the sixth embodiment, using the two acousto-optical modulators (the first acousto-optical modulator (AOM) 12a and the second acousto-optical modulator (AOM) 12b) instead of the acousto-optical deflector 120 in the third embodiment allows for irradiation with pulsed light of three wavelengths, as is the case in the third embodiment. It is noted that the (two) acousto-optical modulators are easier to mount in the laser beam output apparatus 1 at lower cost than the acousto-optical deflector.

Also, in the sixth embodiment, like the third embodiment, there is only one LN crystal substrate 142, all of the polarization reversed sections 144 may be formed in the single LN crystal substrate 142.

It is noted that the sixth embodiment may have the following variation as to the operation of the optical path determining section (the first acousto-optical modulator (AOM) 12a and the second acousto-optical modulator (AOM) 12b).

Figure 15:
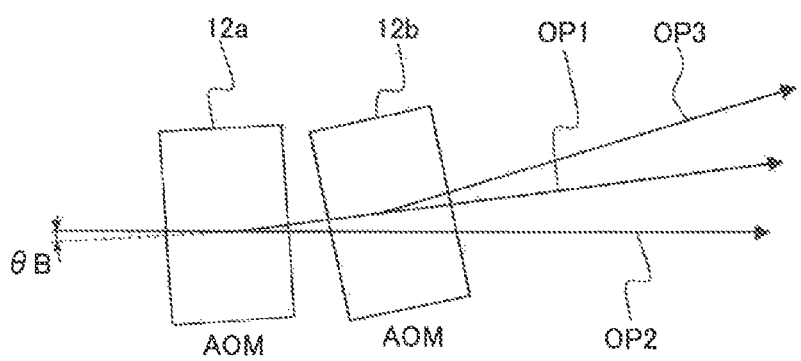
FIG. 15 is an enlarged view around the optical path determining section (the first acousto-optical modulator (AOM) 12a and the second acousto-optical modulator (AOM) 12b) in the laser beam output apparatus 1 according to a variation of the sixth embodiment.

FIG. 15 is an enlarged view around the optical path determining section (the first acousto-optical modulator (AOM) 12a and the second acousto-optical modulator (AOM) 12b) in the laser beam output apparatus 1 according to a variation of the sixth embodiment.

The first acousto-optical modulator (AOM) 12a is arranged to receive the first pulses P1 and determine one among multiple optical paths OP1, OP2 for each of the first pulses P1 for output. For example, the first acousto-optical modulator (AOM) 12a is arranged to diffract (optical path OP1) or directly advance (optical path OP2) each of the first pulses P1 for output. These are the same as in the sixth embodiment.

The second acousto-optical modulator (AOM) 12b is here arranged to receive the output from the first acousto-optical modulator (AOM) 12a and determine one among one or more optical paths OP1, OP2, OP3 for each of the pulses of the output from the first acousto-optical modulator (AOM) 12a for output. In the variation of the sixth embodiment, the second acousto-optical modulator (AOM) 12b is arranged to receive and directly advance (optical path OP2) ("not diffract", which differs from the sixth embodiment) the directly advanced ones (optical path OP2) of the first pulses for output, while receive and diffract (optical path OP3) or directly advance (optical path OP1) ("diffract", which differs from the sixth embodiment) the diffracted ones (optical path OP1) of the first pulses for output.

It is noted that the shorter sides of the second acousto-optical modulator (AOM) 12b are inclined θB (Bragg's angle) counterclockwise with respect to the optical path OP1.

Seventh Embodiment

The laser beam output apparatus 1 according to the seventh embodiment differs from the laser beam output apparatus 1 according to the sixth embodiment mainly in that two acousto-optical modulators (a first acousto-optical modulator (AOM) 12a and a second acousto-optical modulator (AOM) 12b) are used, like the sixth embodiment, for irradiation with pulsed light of four wavelengths.

Figure 13:
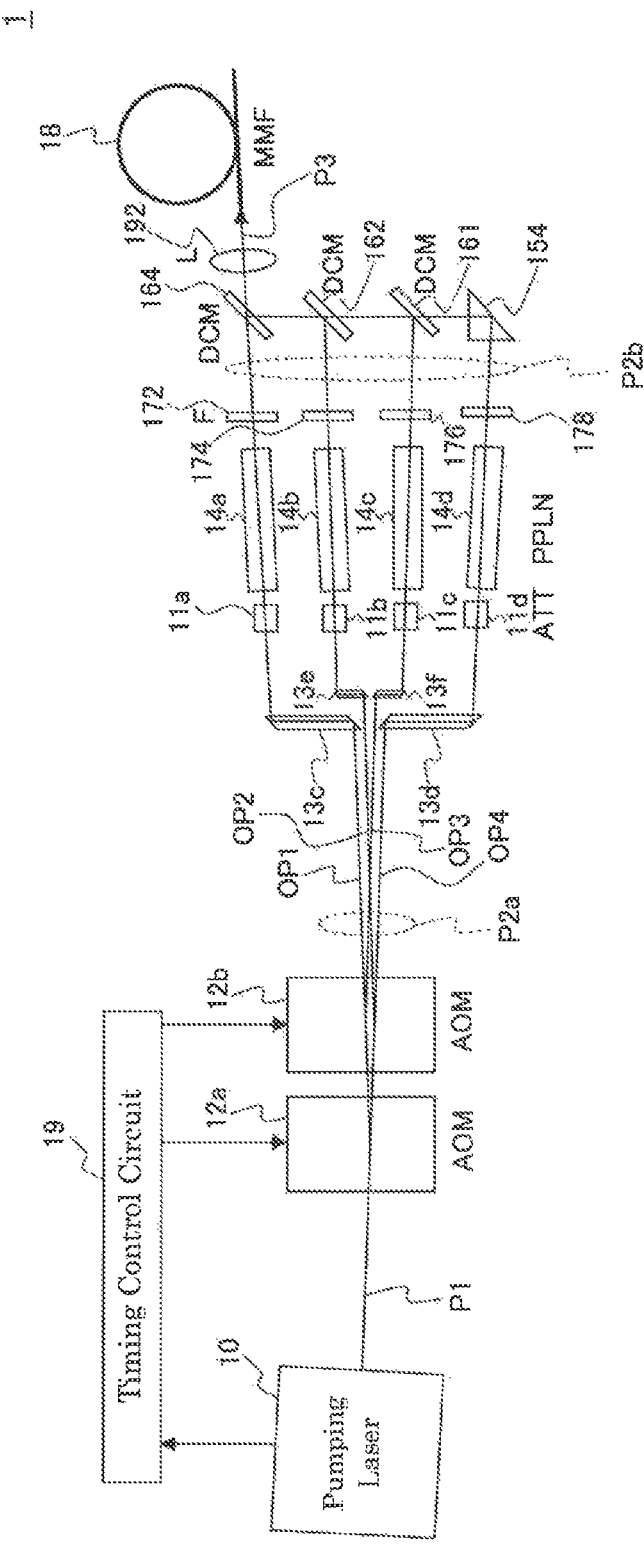
FIG. 13 shows a configuration of the laser beam output apparatus 1 according to the seventh embodiment.
Figure 14:
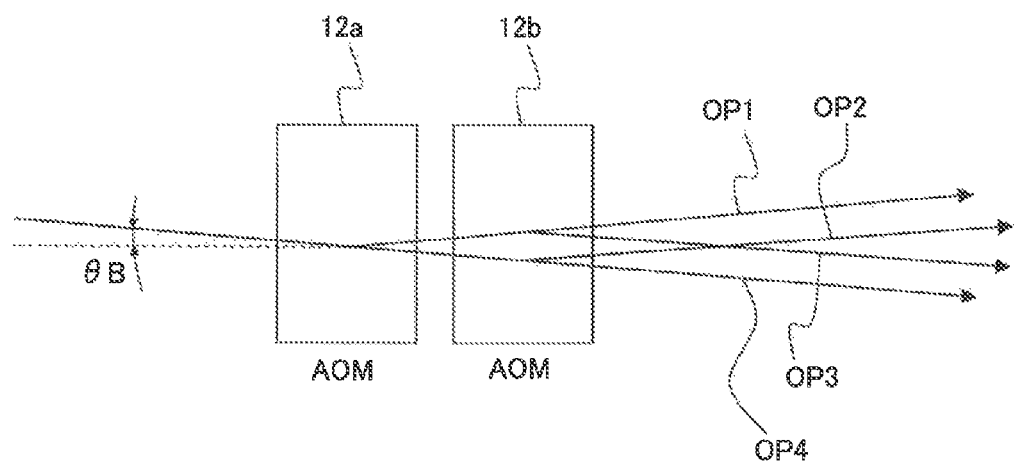
FIG. 14 is an enlarged view around the optical path determining section (the first acousto-optical modulator (AOM) 12a and the second acousto-optical modulator (AOM) 12b) in the laser beam output apparatus 1 according to the seventh embodiment.

FIG. 13 shows a configuration of the laser beam output apparatus 1 according to the seventh embodiment. FIG. 14 is an enlarged view around the optical path determining section (the first acousto-optical modulator (AOM) 12a and the second acousto-optical modulator (AOM) 12b) in the laser beam output apparatus 1 according to the seventh embodiment.

The laser beam output apparatus 1 according to the seventh embodiment includes a pumping laser (pulsed laser output section) 10, optical attenuators (ATT) 11a, 11b, 11c, 11d, a first acousto-optical modulator (AOM) 12a, a second acousto-optical modulator (AOM) 12b, rhomboid prisms 13c, 13d, 13e, 13f, wavelength changing sections (PPLN) 14a, 14b, 14c, 14d, a mirror 154, dichroic mirrors (multiplexers) (DCM) 161, 162, 164, filters (F) 172, 174, 176, 178, an optical fiber (MMF) 18, a timing control circuit (timing control section) 19, and a lens (L) 192. Components identical to those in the sixth embodiment will hereinafter be designated by the same reference signs to omit the description thereof.

The pumping laser (pulsed laser output section) 10, the optical attenuators (ATT) 11a, 11b, 11c, the wavelength changing sections (PPLN) 14a, 14b, 14c, the mirror 154, the dichroic mirrors (multiplexers) (DCM) 162, 164, the filters (F) 172, 174, 176, the optical fiber (MMF) 18, the timing control circuit (timing control section) 19, and the lens (L) 192 are identical to those in the sixth embodiment, and the description thereof will be omitted.

Note, however, that the mirror 154 is arranged to receive ones of the second pulses (after wavelength conversion) P2b traveling through the optical path OP4 and reflect them toward the dichroic mirror 161. The dichroic mirror (multiplexer) (DCM) 162 is arranged to multiplex ones of the second pulses (after wavelength conversion) P2b traveling through the optical path OP2 and the reflected light beams from the dichroic mirror 161 and reflect them toward the dichroic mirror 164. The filter 176 is arranged to remove the pump beam and the idler beam from the output from the wavelength changing section (PPLN) 14c for output to the dichroic mirror (multiplexer) (DCM) 161.

The filter 178 is arranged to remove the pump beam and the idler beam from the output from the wavelength changing section (PPLN) 14d for output to the mirror 154.

The optical path determining section has the first acousto-optical modulator (AOM) 12a and the second acousto-optical modulator (AOM) 12b. Both the first acousto-optical modulator (AOM) 12a and the second acousto-optical modulator (AOM) 12b have a rectangular planar shape.

The longer sides of the first acousto-optical modulator (AOM) 12a and the longer sides of the second acousto-optical modulator (AOM) 12b are in parallel to each other. It is noted that the optical path OP4 is inclined GB (Bragg's angle) clockwise with respect to the shorter sides of the first acousto-optical modulator (AOM) 12a. One of the longer sides of the first acousto-optical modulator (AOM) 12a receives the first pulses P1, while one of the longer sides of the second acousto-optical modulator (AOM) 12 receives the output from the first acousto-optical modulator 12a.

The first acousto-optical modulator (AOM) 12a is arranged to receive the first pulses P1 and determine one among multiple optical paths OP1, OP4 for each of the first pulses P1 for output. In the seventh embodiment, the first acousto-optical modulator (AOM) 12a is arranged to diffract (optical path OP1) or directly advance (optical path OP4) each of the first pulses P1 for output.

The second acousto-optical modulator (AOM) 12b is arranged to receive the output from the first acousto-optical modulator 12a and determine one among one or more optical paths OP1, OP2, OP3, OP4 for each of the pulses of the output from the first acousto-optical modulator 12a for output. In the seventh embodiment, the second acousto-optical modulator (AOM) 12b is arranged to diffract (optical path OP2, OP3) or directly advance (optical path OP1, OP4) each of the pulses of the output from the first acousto-optical modulator (AOM) 12a for output. In more detail, the second acousto-optical modulator (AOM) 12b is arranged to receive and diffract (optical path OP2) or directly advance (optical path OP4) the directly advanced ones (optical path OP4) of the first pulses for output, while receive and diffract (optical path OP3) or directly advance (optical path OP1) the diffracted ones (optical path OP1) of the first pulses for output.

At the time the optical path determining section receives (1+4N)-numbered (1st, 5th, 9th . . . ) ones (where N represents an integer equal to or greater than 0) of the first pulses P1, an acoustic wave is provided to the first acousto-optical modulator (AOM) 12a, while no acoustic wave is provided to the second acousto-optical modulator (AOM) 12b. The (1+4N)-numbered ones of the first pulses P1 then travel through the optical path OP1 (see FIG. 14).

At the time the optical path determining section receives (2+4N)-numbered (2nd, 6th, 10th . . . ) ones of the first pulses P1, no acoustic wave is provided to the first acousto-optical modulator (AOM) 12a, while an acoustic wave is provided to the second acousto-optical modulator (AOM) 12b. The (2+4N)-numbered ones of the first pulses P1 then travel through the optical path OP2 (see FIG. 14).

At the time the optical path determining section receives (3+4N)-numbered (3rd, 7th, 11th . . . ) ones of the first pulses P1, an acoustic wave is provided to the first acousto-optical modulator (AOM) 12a and an acoustic wave is also provided to the second acousto-optical modulator (AOM) 12b. The (3+4N)-numbered ones of the first pulses P1 then travel through the optical path OP3 (see FIG. 14).

At the time the optical path determining section receives (4+4N)-numbered (4th, 8th, 12th . . . ) ones of the first pulses P1, no acoustic wave is provided to the first acousto-optical modulator (AOM) 12a and no acoustic wave is also provided to the second acousto-optical modulator (AOM) 12b. The (4+4N)-numbered ones of the first pulses P1 then travel through the optical path OP4 (see FIG. 14).

This causes the optical path determining section to output, respectively on the multiple optical paths OP1, OP2, OP3, OP4, second pulses (before wavelength conversion) P2a having a frequency (½ kHz) obtained by dividing the predetermined frequency (e.g. 2 kHz) by the number (four) of the multiple optical paths and having their respective 90-degree different phases.

The rhomboid prism 13c is arranged to receive ones of the second pulses (before wavelength conversion) P2a traveling through the optical path OP1 and change the optical path in parallel away from the optical path OP1. The rhomboid prism 13e is arranged to receive ones of the second pulses (before wavelength conversion) P2a traveling through the optical path OP2 and change the optical path in parallel away from the optical path OP2. The rhomboid prism 13f is arranged to receive ones of the second pulses (before wavelength conversion) P2a traveling through the optical path OP3 and change the optical path in parallel away from the optical path OP3. The rhomboid prism 13d is arranged to receive ones of the second pulses (before wavelength conversion) P2a traveling through the optical path OP4 and change the optical path in parallel away from the optical path OP4.

The optical attenuator (ATT) 11d is arranged to attenuate therethrough the light beams traveling through the optical path OP4 (output from the rhomboid prism 13d) and provide them to the wavelength changing section (PPLN) 14d.

The wavelength changing section (PPLN) 14d is arranged to receive from the rhomboid prism 13d and convert ones (wavelength W1 [nm]) of the second pulses P2a traveling through the optical path OP4 into second pulses P2b (wavelength W5 [nm]). The arrangement of the wavelength changing section 14d corresponds to the polarization reversed sections 144 arranged at the predetermined spacing D2 (where the predetermined spacing D2 should be read D4, which differs from D1, D2, and D3) and the LN crystal substrate 142 in which the polarization reversed sections 144 are formed as shown in FIG. 2 or 4.

It is noted that the LN crystal substrate that the wavelength changing section 14a has, the LN crystal substrate that the wavelength changing section 14b has, the LN crystal substrate that the wavelength changing section 14c has, and the LN crystal substrate that the wavelength changing section 14d has are not identical to each other. That is, the LN crystal substrate that the wavelength changing section 14a has, the LN crystal substrate that the wavelength changing section 14b has, the LN crystal substrate that the wavelength changing section 14c has, and the LN crystal substrate that the wavelength changing section 14d has are provided, respectively, for the light beams (traveling through the optical path OP1, the optical path OP2, the optical path OP3, and the optical path OP4) that propagate therethrough.

Next will be described an operation according to the seventh embodiment.

The pumping laser 10 first outputs a laser beam having a predetermined wavelength W1 [nm] as first pulses P1 having a predetermined frequency (e.g. 2 kHz). The first pulses P1 are provided to the first acousto-optical modulator (AOM) 12a of the optical path determining section. The timing control circuit 19 controls the timing of the output from the optical path determining section.

At the time the optical path determining section receives (1+4N)-numbered (1st, 5th, 9th . . . ) ones (where N represents an integer equal to or greater than 0) of the first pulses P1, an acoustic wave is provided to the first acousto-optical modulator (AOM) 12a, while no acoustic wave is provided to the second acousto-optical modulator (AOM) 12b. The (1+4N)-numbered ones of the first pulses P1 then travel through the optical path OP1 (see FIG. 14). This causes light beams traveling through the optical path OP1 to be second pulses (before wavelength conversion) P2a having a frequency (½ kHz) obtained by dividing the predetermined frequency (e.g. 2 kHz) by the number (four) of the multiple optical paths.

At the time the optical path determining section receives (2+4N)-numbered (2nd, 6th, 10th . . . ) ones of the first pulses P1, no acoustic wave is provided to the first acousto-optical modulator (AOM) 12a, while an acoustic wave is provided to the second acousto-optical modulator (AOM) 12b. The (2+4N)-numbered ones of the first pulses P1 then travel through the optical path OP2 (see FIG. 14). This causes light beams traveling through the optical path OP2 to be second pulses (before wavelength conversion) P2a having a frequency (½ kHz) obtained by dividing the predetermined frequency (e.g. 2 kHz) by the number (four) of the multiple optical paths.

At the time the optical path determining section receives (3+4N)-numbered (3rd, 7th, 11th . . . ) ones of the first pulses P1, an acoustic wave is provided to the first acousto-optical modulator (AOM) 12a and an acoustic wave is also provided to the second acousto-optical modulator (AOM) 12b. The (3+4N)-numbered ones of the first pulses P1 then travel through the optical path OP3 (see FIG. 14). This causes light beams traveling through the optical path OP3 to be second pulses (before wavelength conversion) P2a having a frequency (½ kHz) obtained by dividing the predetermined frequency (e.g. 2 kHz) by the number (four) of the multiple optical paths.

At the time the optical path determining section receives (4+4N)-numbered (4th, 8th, 12th . . . ) ones of the first pulses P1, no acoustic wave is provided to the first acousto-optical modulator (AOM) 12a and no acoustic wave is also provided to the second acousto-optical modulator (AOM) 12b. The (4+4N)-numbered ones of the first pulses P1 then travel through the optical path OP4 (see FIG. 14). This causes light beams traveling through the optical path OP4 to be second pulses (before wavelength conversion) P2a having a frequency (½ kHz) obtained by dividing the predetermined frequency (e.g. 2 kHz) by the number (four) of the multiple optical paths.

In addition, the phase of the light beams traveling through the optical path OP1 (second pulses (before wavelength conversion) P2a), the phase of the light beams traveling through the optical path OP2 (second pulses (before wavelength conversion) P2a), the phase of the light beams traveling through the optical path OP3 (second pulses (before wavelength conversion) P2a), and the phase of the light beams traveling through the optical path OP4 (second pulses (before wavelength conversion) P2a) are 90-degree different from each other.

The light beams traveling through the optical path OP1 (second pulses (before wavelength conversion) P2a, with a wavelength W1 [nm]) undergo a change in the optical path through the rhomboid prism 13c to be attenuated through the optical attenuator (ATT) 11a and provided to the wavelength changing section (PPLN) 14a. Further, the light beams provided to the wavelength changing section (PPLN) 14a propagate through the polarization reserved sections 144, which are arranged at the predetermined spacing D1 in the wavelength changing section 14a, to undergo wavelength conversion into W2 [nm] to be second pulses (after wavelength conversion) P2b, and then undergo removal of the pump beam and the idler beam through the filter (F) 172 to be provided to the dichroic mirror 164.

The light beams traveling through the optical path OP2 (second pulses (before wavelength conversion) P2a, with a wavelength W1 [nm]) undergo a change in the optical path through the rhomboid prism 13e to be attenuated through the optical attenuator (ATT) 11b and provided to the wavelength changing section (PPLN) 14b. Further, the light beams provided to the wavelength changing section (PPLN) 14b propagate through the polarization reserved sections 144, which are arranged at the predetermined spacing D2 in the wavelength changing section 14b, to undergo wavelength conversion into W3 [nm] to be second pulses (after wavelength conversion) P2b, and then undergo removal of the pump beam and the idler beam through the filter (F) 174 to be reflected by the dichroic mirror 162 and provided to the dichroic mirror 164.

The light beams traveling through the optical path OP3 (second pulses (before wavelength conversion) P2a, with a wavelength W1 [nm]) undergo a change in the optical path through the rhomboid prism 13f to be attenuated through the optical attenuator (ATT) 11c and provided to the wavelength changing section (PPLN) 14c. Further, the light beams provided to the wavelength changing section (PPLN) 14c propagate through the polarization reserved sections 144, which are arranged at the predetermined spacing D3 in the wavelength changing section 14c, to undergo wavelength conversion into W4 [nm] to be second pulses (after wavelength conversion) P2b, and then undergo removal of the pump beam and the idler beam through the filter (F) 176 to be reflected by the dichroic mirror 161 and provided to the dichroic mirror 164 via the dichroic mirror 162.

The light beams traveling through the optical path OP4 (second pulses (before wavelength conversion) P2a, with a wavelength W1 [nm]) undergo a change in the optical path through the rhomboid prism 13d to be attenuated through the optical attenuator (ATT) 11d and provided to the wavelength changing section (PPLN) 14d. Further, the light beams provided to the wavelength changing section (PPLN) 14d propagate through the polarization reserved sections 144, which are arranged at the predetermined spacing D4 in the wavelength changing section 14d, to undergo wavelength conversion into W5 [nm] to be second pulses (after wavelength conversion) P2b, and then undergo removal of the pump beam and the idler beam through the filter (F) 178 to be reflected by the mirror 154 and provided to the dichroic mirror 164 via the dichroic mirrors 161, 162.

Ones of the second pulses (after wavelength conversion) P2b output from the wavelength changing sections 14a, 14b, 14c, 14d and having the wavelength W2 [nm], the wavelength W3 [nm], the wavelength W4 [nm], and the wavelength W5 [nm] are multiplexed through the dichroic mirror 164 to be third pulses P3 having a predetermined frequency (2 kHz).

The third pulses P3 go through the lens (L) 192 and provided to the optical fiber (MMF) 18.

In accordance with the seventh embodiment, using the two acousto-optical modulators (the first acousto-optical modulator (AOM) 12a and the second acousto-optical modulator (AOM) 12b), as is the case in the sixth embodiment, allows for irradiation with pulsed light of four wavelengths, the number being larger than that in the sixth embodiment.

Also, in the seventh embodiment, like the third embodiment, there is only one LN crystal substrate 142, all of the polarization reversed sections 144 may be formed in the single LN crystal substrate 142.

DESCRIPTION OF REFERENCE NUMERAL

P1 First Pulses
P2a Second Pulses (before wavelength conversion)
P2b Second Pulses (after wavelength conversion)
P3a Third Pulses (before filtering)
P3b Third Pulses (after filtering)
P3 Third Pulses
OP1, OP2, OP3, OP4 Optical Paths
1 Laser Beam Output Apparatus
10 Pumping Laser (Pulsed Laser Output Section)
11, 11a, 11b, 11c, 11d Optical Attenuator (ATT)
12 Acousto-Optical Modulator (Optical Path Determining Section) (AOM)
12a First Acousto-Optical Modulator (AOM)
12b Second Acousto-Optical Modulator (AOM)
120 Acousto-Optical Deflector (AOD) (Optical Path Determining Section)
13, 13a, 13b, 13c, 13d, 13e, 13f Rhomboid Prisms
14, 14a, 14b, 14c, 14d Wavelength Changing Section (PPLN)
142 LN Crystal Substrate
144 Polarization Reversed Sections
15, 154 Mirror
16, 161, 162, 164 Dichroic Mirror (Multiplexer) (DCC)
17, 172, 174, 176, 178 Filter (F)
18 Optical Fiber (MMF)
19 Timing Control Circuit (Timing Control Section)

What is claimed is:

1. A laser beam output apparatus, comprising:
a pulsed laser that outputs a laser beam having a predetermined wavelength as pulses;
an optical path determiner that receives the pulses and determines one among a plurality of optical paths for each of the pulses for output;
a wavelength changer that receives light beams traveling, respectively, through the plurality of optical paths and changes the light beams to have their respective different wavelengths for output; and
a multiplexer that multiplexes outputs from the wavelength changer,
wherein the optical path determiner outputs, respectively, on the plurality of optical paths, optical path determined pulses among the pulses within predetermined temporal ranges thereof, the predetermined temporal ranges not overlapping each other, and
wherein the pulses are from a pseudo-random signal.

2. The laser beam output apparatus according to claim 1, wherein the pulsed laser is a pumping laser.

3. The laser beam output apparatus according to claim 1, wherein the optical path determiner is an acousto-optical modulator or an acousto-optical deflector.

4. The laser beam output apparatus according to claim 1, wherein the wavelength changer has polarization reversed sections arranged with predetermined spacing therebetween through which the traveling light beams propagate, and
wherein the predetermined spacing is different for each of the traveling light beams.

5. The laser beam output apparatus according to claim 4, wherein the wavelength changer has a non-linear optical crystal substrate with the polarization reversed sections formed therein, and
wherein graphical centers of the polarization reversed sections are arranged on a straight line parallel to an X axis of the non-linear optical crystal substrate.

6. The laser beam output apparatus according to claim 4, wherein graphical centers of the polarization reversed sections are arranged on a straight line parallel to the traveling direction of the traveling light beams.

7. The laser beam output apparatus according to claim 4, wherein the wavelength changer has one non-linear optical crystal substrate with all of the polarization reversed sections formed therein.

8. The laser beam output apparatus according to claim 4, wherein the wavelength changer has a non-linear optical crystal substrate with the polarization reversed sections formed therein, and
wherein the non-linear optical crystal substrate is provided for each of the traveling light beams that propagate therethrough.

9. The laser beam output apparatus according to claim 1, wherein the wavelength changer has a non-linear optical crystal through which the traveling light beams propagate.

10. The laser beam output apparatus according to claim 1, further comprising:
an optical fiber with one end receiving an output from the multiplexer for output at an other end thereof.

11. The laser beam output apparatus according to claim 1, further comprising:
a timing controller control section that times an output from the optical path determiner-to an output of the pulses.

12. The laser beam output apparatus according to claim 1, wherein the optical path determiner includes
a first acousto-optical modulator that receives the pulses and determines one among a plurality of optical paths for each of the pulses for output; and
a second acousto-optical modulator that receives an output from the first acousto-optical modulator and determines one among one or more optical paths for each pulse of the output from the first acousto-optical modulator for output.

13. The laser beam output apparatus according to claim 12,
wherein the first acousto-optical modulator diffracts or directly advances each of the pulses for output, and
wherein the second acousto-optical modulator receives and diffracts or directly advances the directly advanced ones of the pulses for output, and receives and directly advances the diffracted ones of the pulses for output.

14. The laser beam output apparatus according to claim 12,
wherein the first acousto-optical modulator diffracts or directly advances each of the pulses for output, and
wherein the second acousto-optical modulator receives and diffracts or directly advances the diffracted ones of the pulses for output, and receives and directly advances the directly advanced ones of the pulses for output.

15. The laser beam output apparatus according to claim 12,
wherein the first acousto-optical modulator diffracts or directly advances each of the pulses for output, and
wherein the second acousto-optical modulator diffracts or directly advances each pulse of the output from the first acousto-optical modulator for output.

* * * * *